US008569722B2

United States Patent
Kakizaki et al.

(10) Patent No.: US 8,569,722 B2
(45) Date of Patent: Oct. 29, 2013

(54) EXTREME ULTRAVIOLET LIGHT GENERATION APPARATUS

(75) Inventors: Kouji Kakizaki, Hiratsuka (JP); Tooru Abe, Hiratsuka (JP); Osamu Wakabayashi, Hiratsuka (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 13/042,755

(22) Filed: Mar. 8, 2011

(65) Prior Publication Data

US 2011/0220816 A1    Sep. 15, 2011

(30) Foreign Application Priority Data

Mar. 11, 2010  (JP) .................................. 2010-055153
Jan. 31, 2011  (JP) .................................. 2011-018748

(51) Int. Cl.
*H05G 2/00*   (2006.01)
(52) U.S. Cl.
USPC ..................................................... 250/504 R
(58) Field of Classification Search
USPC ..................................................... 250/504 R
See application file for complete search history.

(56) References Cited

U.S. PATENT DOCUMENTS

| 7,655,925 | B2* | 2/2010 | Bykanov et al. | 250/436 |
| 7,671,349 | B2* | 3/2010 | Bykanov et al. | 250/504 R |
| 8,138,487 | B2* | 3/2012 | Vaschenko et al. | 250/504 R |
| 2004/0057475 | A1* | 3/2004 | Frankel et al. | 372/25 |
| 2008/0149862 | A1* | 6/2008 | Hansson et al. | 250/504 R |
| 2008/0179548 | A1* | 7/2008 | Bykanov et al. | 250/504 R |
| 2009/0314967 | A1* | 12/2009 | Moriya et al. | 250/504 R |
| 2010/0127186 | A1* | 5/2010 | Bykanov et al. | 250/423 P |
| 2010/0127191 | A1* | 5/2010 | Partlo et al. | 250/504 R |
| 2010/0140512 | A1* | 6/2010 | Suganuma et al. | 250/504 R |
| 2010/0140514 | A1* | 6/2010 | Bykanov et al. | 250/504 R |
| 2010/0192973 | A1* | 8/2010 | Ueno et al. | 134/1.1 |
| 2010/0193710 | A1* | 8/2010 | Wakabayashi et al. | 250/504 R |
| 2011/0248191 | A1* | 10/2011 | Fomenkov et al. | 250/504 R |
| 2012/0012762 | A1* | 1/2012 | Nowak et al. | 250/504 R |

FOREIGN PATENT DOCUMENTS

JP    3775840 B    3/2006

* cited by examiner

*Primary Examiner* — David A Vanore
*Assistant Examiner* — Wyatt Stoffa
(74) *Attorney, Agent, or Firm* — McDermott Will & Emery LLP

(57) ABSTRACT

An extreme ultraviolet light generation apparatus may include: a laser apparatus; a chamber provided with an inlet for introducing a laser beam outputted from the laser apparatus to the inside thereof; a target supply unit provided to the chamber for supplying a target material to a predetermined region inside the chamber; a collector mirror disposed in the chamber for collecting extreme ultraviolet light generated when the target material is irradiated with the laser beam in the chamber; an extreme ultraviolet light detection unit for detecting energy of the extreme ultraviolet light; and an energy control unit for controlling energy of the extreme ultraviolet light.

17 Claims, 26 Drawing Sheets

EXTREME ULTRAVIOLET LIGHT GENERATION APPARATUS

CROSS-REFERENCE TO RELATED APPLICATIONS

The present application claims priority from Japanese Patent Application No. 2010-055153 filed Mar. 11, 2010, and Japanese Patent Application No. 2011-018748 filed Jan. 31, 2011, the disclosure of each of which is incorporated herein by reference in its entirety.

BACKGROUND

1. Technical Field

This disclosure relates to an apparatus for generating extreme ultraviolet (EUV) light.

2. Related Art

With recent increase in integration of semiconductor process, transfer patterns for use in photolithography of the semiconductor process have rapidly become finer. In the next generation, microfabrication at 70 to 45 nm, and further, microfabrication at 32 nm or less is to be demanded. Accordingly, for example, to meet the demand for microfabrication at 32 nm or less, an exposure apparatus is expected to be developed, where EUV light of a wavelength of approximately 13 nm is combined with a reduction projection reflective optical system.

There are mainly three types of known EUV light generation apparatuses, namely, a laser produced plasma (LPP) type apparatus using plasma produced as a target material is irradiated with a laser beam, a discharge produced plasma (DPP) type apparatus using plasma produced by discharge, and a synchrotron radiation (SR) type apparatus using orbital radiation.

SUMMARY

An extreme ultraviolet light generation apparatus according to one aspect of this disclosure may include: a laser apparatus; a chamber provided with an inlet for introducing a laser beam outputted from the laser apparatus to the inside thereof; a target supply unit provided to the chamber for supplying a target material to a predetermined region inside the chamber; a collector mirror disposed in the chamber for collecting extreme ultraviolet light generated when the target material is irradiated with the laser beam in the chamber; an extreme ultraviolet light detection unit for detecting energy of the extreme ultraviolet light; and an energy control unit for controlling energy of the extreme ultraviolet light.

According to another aspect of this disclosure, a method for controlling an output of burst-outputted extreme ultraviolet light, in an extreme ultraviolet light generation apparatus including a laser apparatus, a chamber, a target supply unit, a collector mirror for collecting extreme ultraviolet light, an extreme ultraviolet light detection unit, and an energy control unit for controlling energy of the extreme ultraviolet light, may include: supplying a target material into the chamber; irradiating the target material with a laser beam; detecting energy of an extreme ultraviolet light pulse emitted when the target material is irradiated with the laser beam; and controlling energy of an extreme ultraviolet light pulse outputted following the extreme ultraviolet light pulse, based on the detection result.

These and other objects, features, aspects, and advantages of this disclosure will become apparent to those skilled in the art from the following detailed description, which, taken in conjunction with the annexed drawings, discloses preferred embodiments of this disclosure.

DESCRIPTION OF PREFERRED EMBODIMENTS

Figure 1:
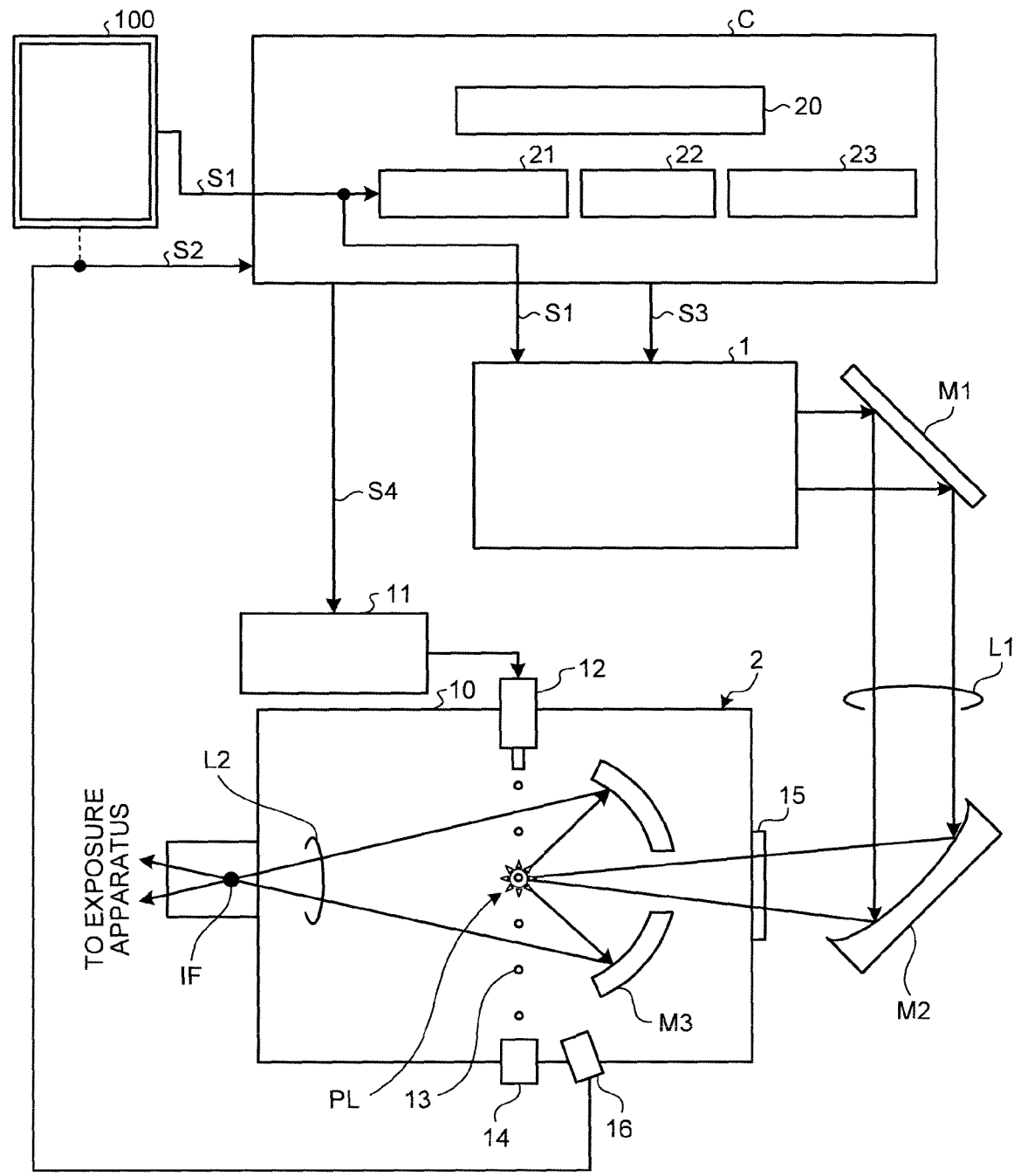
FIG. 1 schematically illustrates an EUV light generation system according to a first embodiment of this disclosure.

Hereinafter, embodiments of this disclosure will be described in detail with reference to the accompanying drawings. The embodiments described below merely show an example of this disclosure and do not limit the scope of this disclosure. Further, configurations and operation described in each embodiment may not be required configurations and operation of this disclosure. It should be noted that like elements are referenced by like reference numerals, and duplicate description thereof will be omitted.

First Embodiment

First, an EUV light generation apparatus according to a first embodiment of this disclosure will be described. FIG. 1 is a schematic diagram illustrating a configuration of an EUV light generation system according to the first embodiment. The EUV light generation system may include a driver laser 1, an EUV light generation apparatus 2 for generating EUV light L2 using $CO_2$ pulsed laser beam L1 outputted from the driver laser 1, and an EUV light source controller C capable of controlling the driver laser 1 and the EUV light generation apparatus 2.

The driver laser 1 may output the $CO_2$ pulsed laser beam L1 under the control of the EUV light source controller C. The outputted $CO_2$ pulsed laser beam L1 may be reflected by an HR (high reflection) mirror M1 and an off-axis paraboloidal mirror M2, and may enter an EUV chamber 10 through a window 15 of the EUV light generation apparatus 2.

In the EUV light generation apparatus 2, a target generator 12 may output a target 13, which is a droplet of Sn, so that the target 13 passes through a plasma generation region PL inside the EUV chamber 10. The timing at which the target 13 is outputted from the target generator 12 may be controlled with a droplet control signal S4 sent from the EUV light source controller C to a droplet controller 11. The droplet controller 11 may control the timing at which the target 13 is generated in response to the droplet control signal S4. Among the outputted targets 13, targets 13 that have not contributed to the generation of EUV light may be collected into a target collection unit 14 disposed so as to face the target generator 12. Further, the EUV light generation apparatus 2 may include an EUV light detector 16. The EUV light detector 16 may detect the energy of EUV light emitted in the plasma generation region PL, and may output an EUV pulse energy detection signal S2 to the EUV light source controller C.

Meanwhile, the $CO_2$ pulsed laser beam L1, outputted from the driver laser 1, having entered the EUV chamber 10 may be focused in the plasma generation region PL through a through-hole provided at the center of an EUV collector mirror M3. In the plasma generation region PL, the target 13 may be irradiated with the $CO_2$ pulsed laser beam L1, whereby the target material 13 may be turned into plasma. EUV light L2 with a wavelength of approximately 13.5 nm may be emitted from this plasma. The emitted EUV light L2 may be collected by the EUV collector mirror M3, and focused at an intermediate focus IF. Further, the EUV light L2 may enter an exposure apparatus 100 while diverging from the intermediate focus IF.

Based on a trigger signal S1 from the exposure apparatus 100, the EUV light source controller C may control such that at least the timing at which the target 13 is generated is synchronized with the timing at which the $CO_2$ pulsed laser beam L1 is outputted from the driver laser 1, thereby controlling the generation of the EUV light L2 in the plasma generation region PL.

The EUV light source controller C may perform burst lead control processing so that at least lead-side pulse energy is stably at a desirable value at burst light emission. The EUV light source controller C may include an energy control processing unit 20, a pulse history unit 21, a timer 22, and a control amount storage unit 23. The pulse history unit 21 may store an EUV pulse energy value within a predetermined time Tw together with a pulse generation time. In this processing of the EUV pulse energy history, a time at which an EUV pulse is generated may be identified based on the trigger signal S1 from the exposure apparatus 100, and an EUV pulse energy value may be identified based on the EUV pulse energy detection signal S2 from the EUV light detector 16. The EUV pulse energy detection signal S2 may, instead of a detection signal from the EUV light detector 16, be an EUV pulse energy detection signal from an EUV light detector (not shown) provided to the exposure apparatus 100. Alternatively, the configuration may be such that the EUV pulse energy detection signals from both the exposure apparatus 100 and the EUV light detector 16 are used as the EUV pulse energy detection signal S2. The timer 22 may time a predetermined time, for example, a trigger wait time T, which will be described later. The control amount storage unit 23 may updatably store, as a parameter log, a control amount of the lead-side pulse energy corresponding to an averaged EUV pulse energy generated within the predetermined time Tw. The energy control processing unit 20 may perform feedback control, and in particular, the energy control processing unit 20 may learn and update the control amount of the lead-side pulse energy based on the parameter log stored in the pulse history unit 21. The energy control processing unit 20 may perform the burst lead control processing for stabilizing an output of lead-side pulse energy, based on the control amount of the updated lead-side pulse energy.

Figure 2:
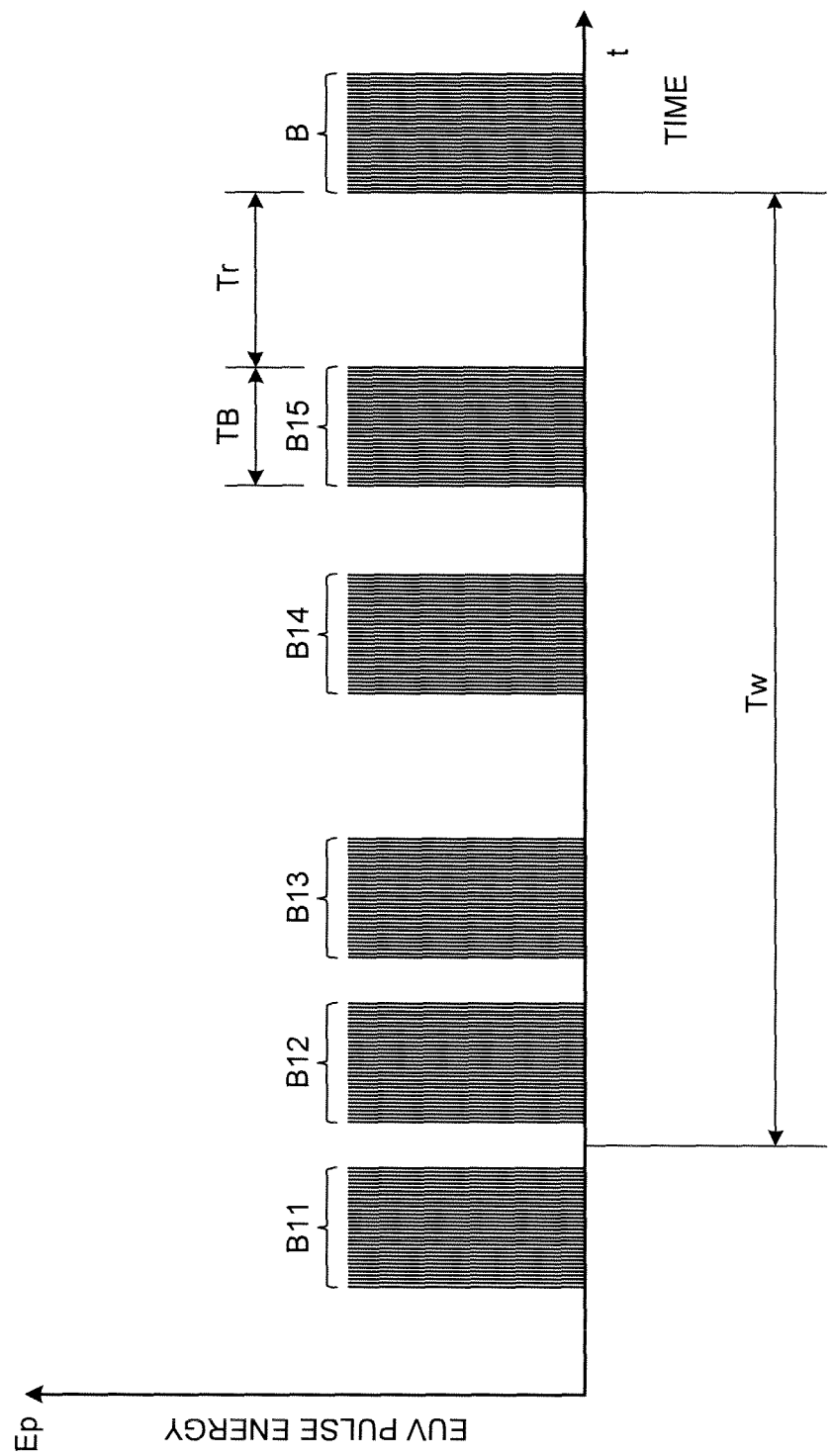
FIG. 2 illustrates change over time in ideal EUV pulse energy at successive burst light emission.

Here, an ideal burst light emission pattern will be described. FIG. 2 is a time chart showing a case in which burst light emission has been generated in order of B11, B12, B13, B14, and B15, and burst light emission B to be controlled next is to be generated. In this case, the burst light emission B12, B13, B14, and B15 are generated within the above-mentioned predetermined time Tw. Also, a burst-length time TB may be a period of the burst light emission B15 immediately preceding the burst light emission B to be controlled. Also, a burst-rest time Tr may be a light-emission-rest time immediately preceding the burst light emission B to be controlled. FIG. 2 shows an ideal burst light emission, in which EUV pulse energy Ep is uniform for every burst light emission.

Figure 3:
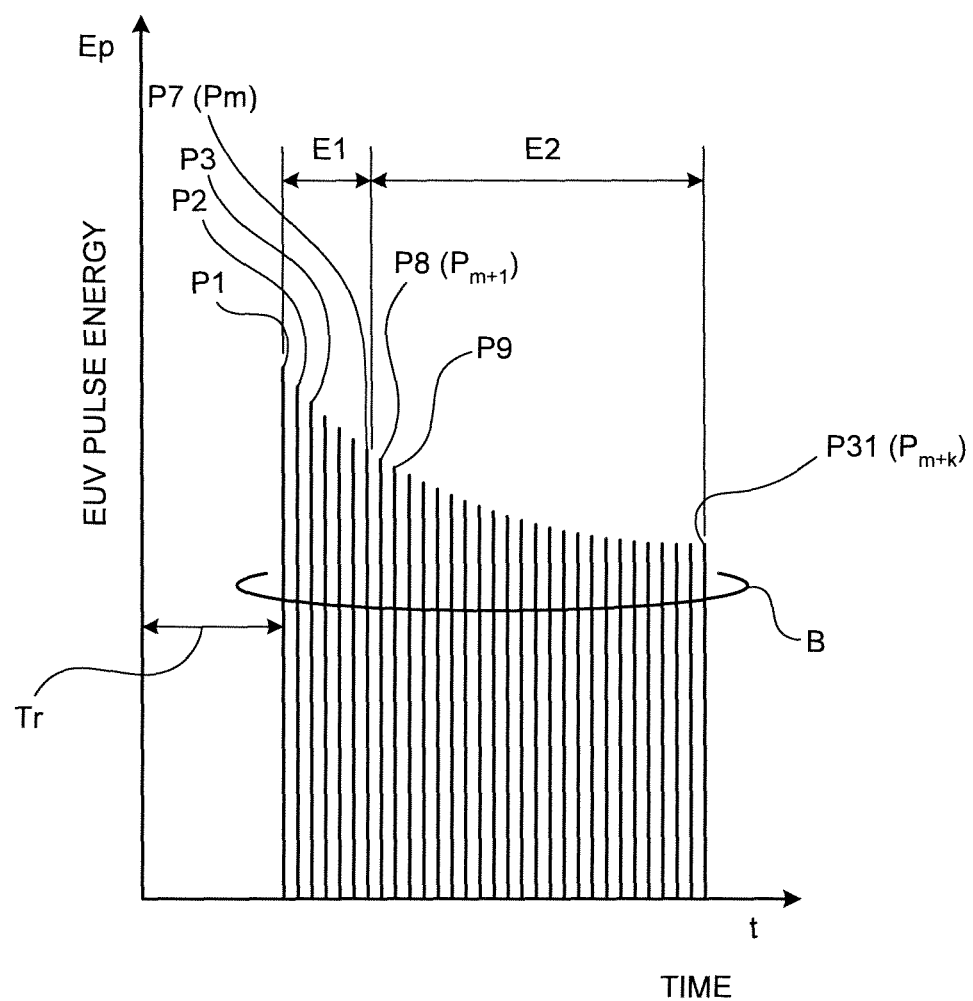
FIG. 3 illustrates change over time in EUV pulse energy when feedback control is not performed at burst light emission.

FIG. 3 shows change over time in EUV pulse energy in the case where the feedback control is not performed for burst light emission. In this burst light emission, 31 successive EUV pulses P1 through P31 are generated, for example. Here, EUV pulses subject to the burst lead control processing by the energy control processing unit 20 may be EUV pulses within a learning control region E1. To be more specific, the EUV pulses subject to the burst lead control processing may be the first m EUV pulses; that is, seven EUV pulses of EUV pulses P1 through P7. Further, EUV pulses within a feedback region E2 may be k EUV pulses of the (m+1)-th pulse through the (m+k)-th pulse, which is the last pulse; that is, 24 EUV pulses of EUV pulses P8 through P31. In this feedback control, the EUV pulse energy of an EUV pulse may be controlled based on the EUV pulse energy of an immediately preceding EUV pulse within the burst light emission.

In general, an EUV light generation system is used as a light source for an exposure apparatus in which an irradiation object, such as a semiconductor wafer, is exposed to light, and which repeats light emission operation with step and scan system. In other words, the EUV light generation apparatus repeats such operation pattern that successive pulsed light emission, i.e., burst light emission at a predetermined operating frequency is performed during scanning exposure and the pulsed light emission is paused during step movement. In order to have this operation pattern repeated, burst oscillation operation is performed, where successive pulse oscillation for a predetermined time in which the burst light emission is performed and pulse oscillation pause are repeated.

Here, when the feedback control is not performed for the EUV pulse energy at the burst light emission, a burst light emission pattern may be such that a value of the EUV pulse energy is not constant, as shown in FIG. 3. In particular, with an existing EUV light generation system, each EUV pulse energy is detected at burst light emission, or an averaged EUV pulse energy within a predetermined period is detected, whereby the feedback control is performed for each EUV pulse energy.

However, as shown in FIG. 3, the value of the lead-side pulse energy of burst light emission, in particular, the value of lead pulse energy tends to be a large value, and in many cases, the energy value may exceed the range of values which can be controlled with the feedback control. That is, it is difficult to generate an ideal burst light emission in which values of the EUV pulse energy in a burst light emission period are uniform as shown in FIG. 2. It is contemplated that this is because a burst rest period is provided between burst light emission and a thermal condition in the EUV light generation system may change between the burst light emission period and the burst rest period. Hence, even if the feedback control is performed, it is difficult to stably control the lead-side pulse energy to be a predetermined pulse energy value. Further, when the burst light emission period, the burst rest period, and so forth vary, or when a desirable value of EUV pulse energy varies for each burst light emission period, it is even more difficult to stably control the value of the lead-side pulse energy.

In controlling to stabilize the lead-side pulse energy, even if burst oscillation by the driver laser of the EUV light generation system is stabilized, it is highly likely that the EUV pulse energy cannot be stabilized. That is, the change in thermal condition in the EUV light generation system is a thermal change in an optical element such as a mirror in the EUV light generation system, and this optical element may also be used for the output of the EUV light.

In the first embodiment, in order to control such that the lead-side pulse energy value at the burst light emission is stabilized at a desirable value, the energy control processing unit 20 is configured to perform the burst lead control processing. In this specification, "burst output" is defined as a case in which a successive pulse output of EUV light for a predetermined time and pulse output pause are alternately repeated.

Figure 4:
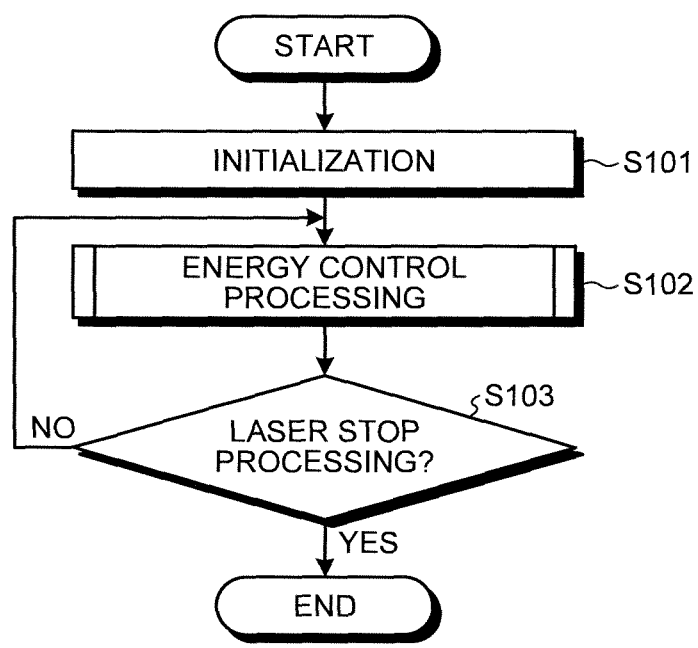
FIG. 4 is a flowchart showing overall control procedure including energy control processing by an EUV light generation controller.
Figure 5:
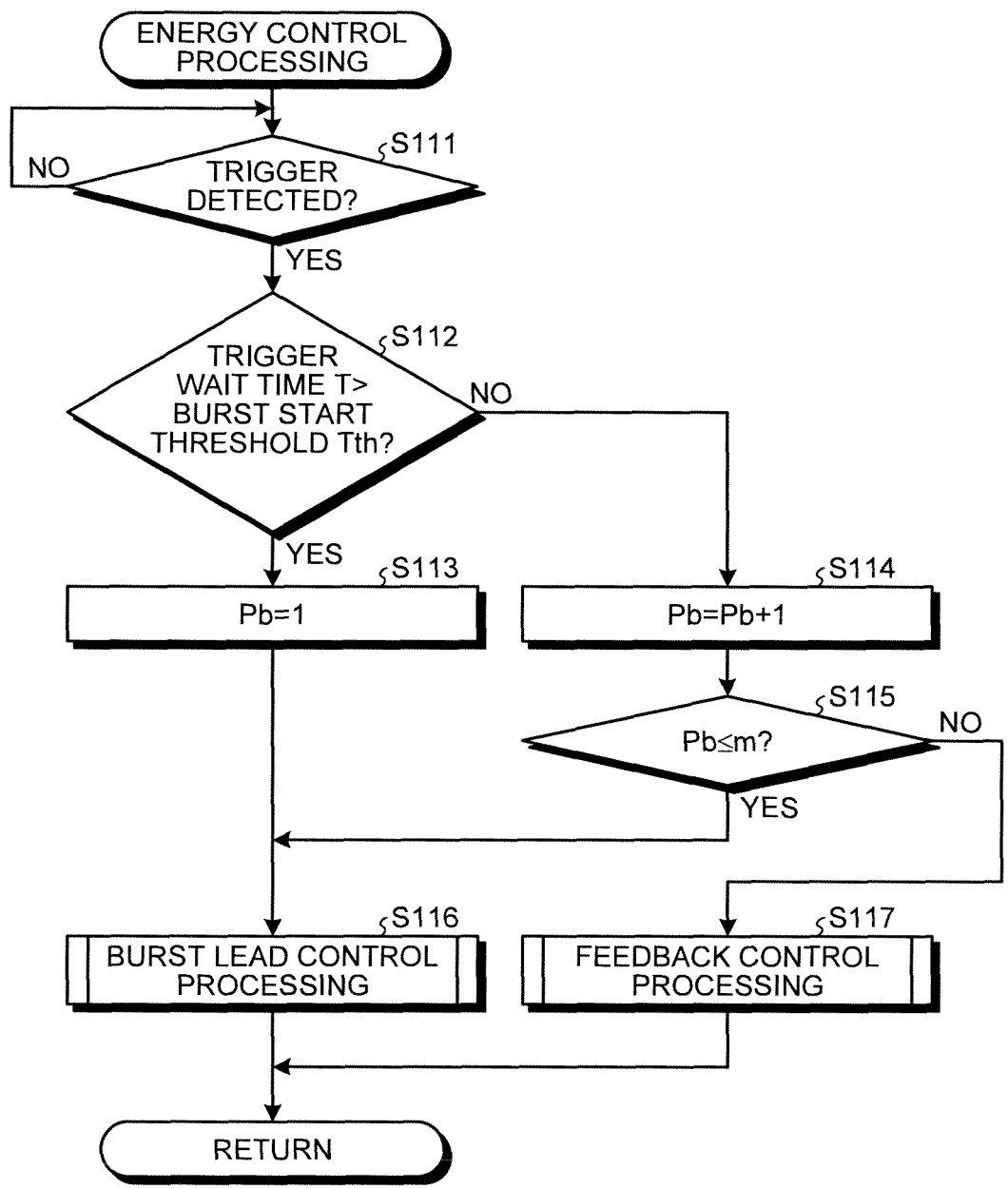
FIG. 5 is a flowchart showing the energy control processing procedure shown in FIG. 4.
Figure 6:
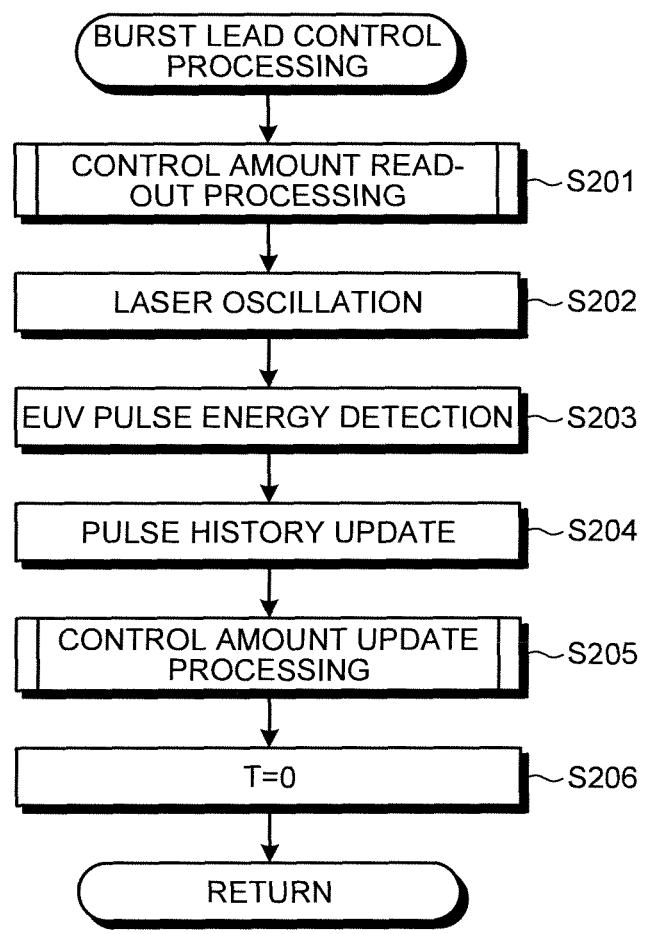
FIG. 6 is a flowchart showing burst-lead control processing procedure shown in FIG. 5.
Figure 7:
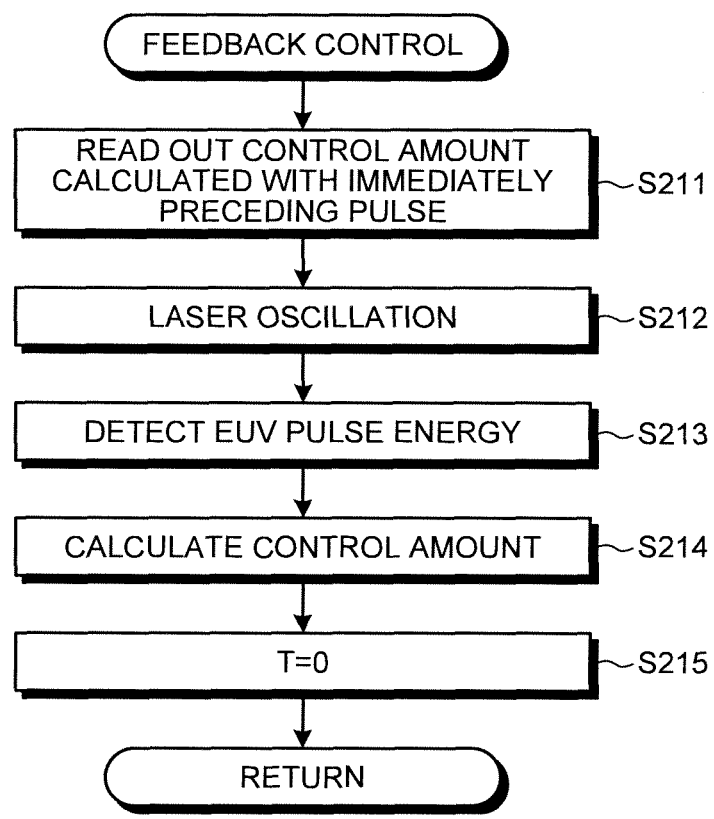
FIG. 7 is a flowchart showing feedback control processing procedure shown in FIG. 5.
Figure 8:
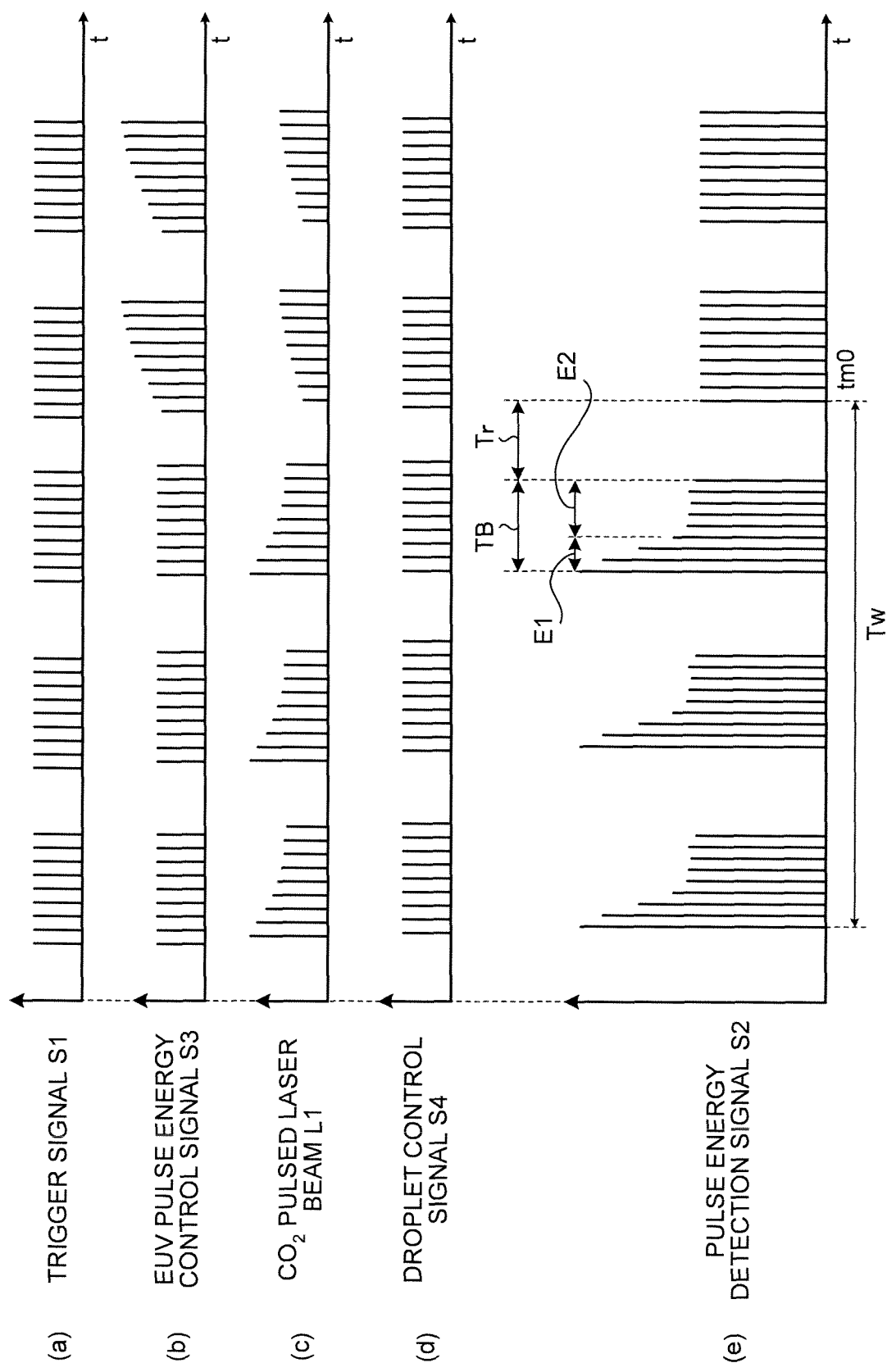
FIG. 8 schematically shows change over time in signals at successive burst light emission.
Figure 9:
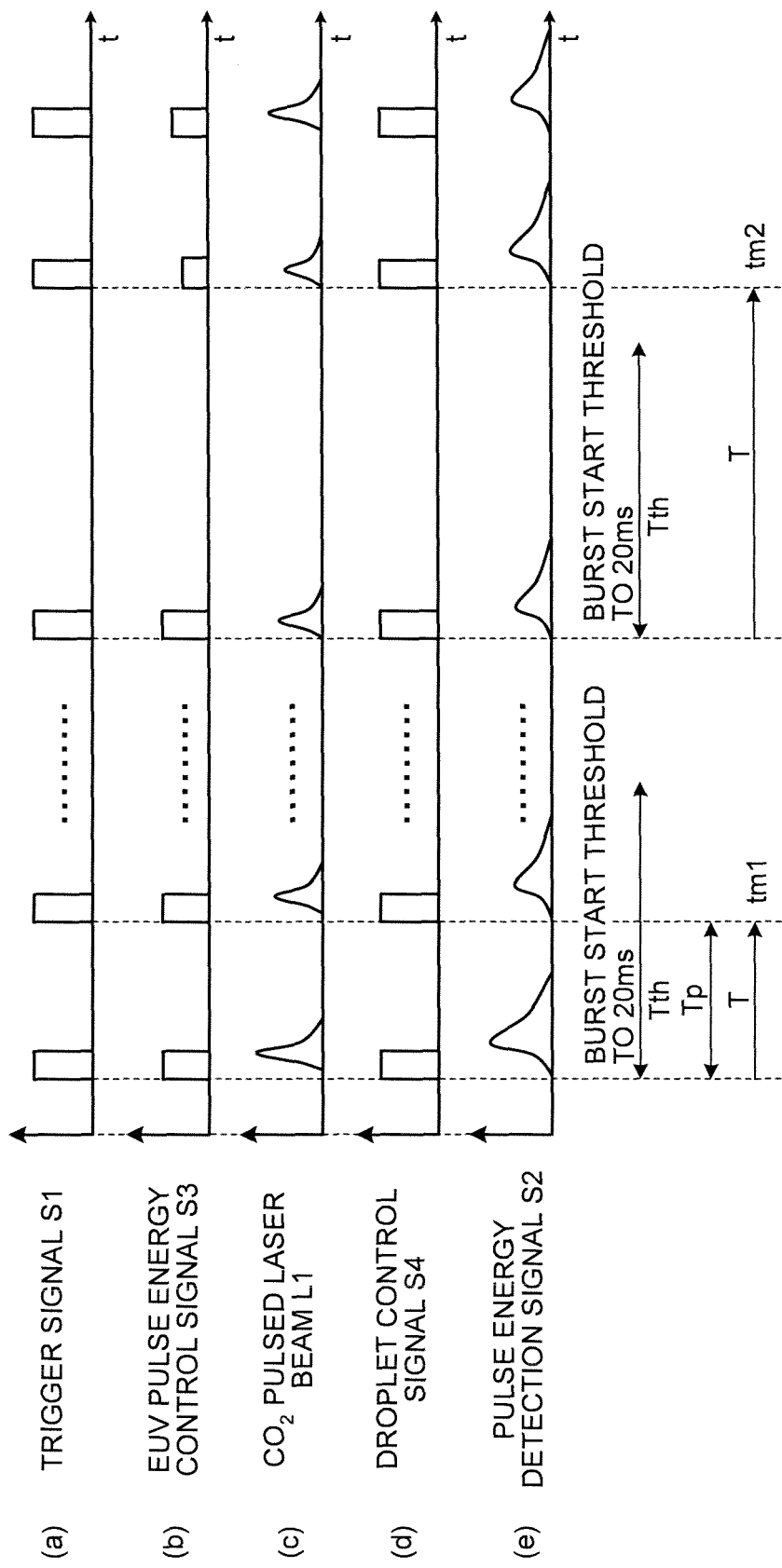
FIG. 9 is a time chart showing, in enlargement, the change over time in signals between two burst light emission shown in FIG. 8.

Next, energy control processing including the burst lead control processing by the energy control processing unit 20 will be described with reference to the drawings. FIG. 4 is a flowchart showing the overall control procedure including the energy control processing by the EUV light source controller C. FIG. 5 is a flowchart showing the energy control processing procedure shown in FIG. 4. FIG. 6 is a flowchart showing the burst lead energy control processing procedure shown in FIG. 5. FIG. 7 is a flowchart showing the feedback control processing procedure shown in FIG. 5. FIG. 8 is a time chart schematically showing change over time in signals during successive burst light emission. FIG. 9 is a time chart showing, in enlargement, change over time in signals between two burst light emission shown in FIG. 8.

First, as shown in FIG. 4, the EUV light source controller C may perform initialization (step S101). This initialization may include setting an initial value of a trigger wait time T so as to be larger than a burst start threshold Tth, setting an initial value for a control amount to be used in the burst lead control processing, and so forth. Then, the EUV light source controller C may perform energy control processing for stabilizing each pulse energy value at the burst light emission at a desirable value (step S102). Then, the EUV light source controller C may determine whether or not processing for stopping laser oscillation is performed (step S103). If the laser oscillation is stopped (step S103, Yes), this processing is ended, and if the laser oscillation is not stopped (step S103, No), this processing shifts to step S102, and the energy control processing may be performed.

As shown in FIG. 5, in the energy control processing in step S102, it may first be determined whether or not the energy control processing unit 20 has detected the trigger signal S1 inputted from the exposure apparatus 100 (step S111). If the energy control processing unit 20 detects the trigger signal S1 (step S111, Yes), it may be determined whether or not the trigger wait time T is larger than the burst start threshold Tth (step S112). As shown in FIG. 9, this trigger wait time T may be a time between trigger signals S1, and may be a value set in the initialization or a time timed by the timer 22. The burst start threshold Tth may be a predetermined value, and may, for example, be 20 ms. As shown in FIG. 9, this burst start threshold Tth may be a value larger than an EUV pulse interval Tp in a burst light emission period.

If the trigger wait time T is equal to or larger than the burst start threshold Tth (step S112, Yes), the energy control processing unit 20 may set a burst pulse number Pb, which is a variable and is counted from the burst lead, to Pb=1 (step S113). Then, the processing shifts to the burst lead control processing in step S116. If the trigger wait time T is not larger than the burst start threshold Tth (step S112, No), the burst pulse number Pb may be incremented to be Pb+1 (step S114). Further, it may be determined whether or not the burst pulse number Pb is equal to or smaller than a predetermined burst lead control pulse number m (step S115). The burst lead control pulse number m may be the number of pulses subject to the burst lead control processing. If the burst pulse number Pb is equal to or smaller than a burst lead control pulse number m (S115, Yes), the processing may shift to step S116, in which the burst lead control processing may be performed. If the burst pulse number Pb is larger than the burst lead control pulse number m (S115, No), the feedback control processing may be performed (step S117). Then, after the burst lead control processing in step S116 or the feedback control processing in step S117 is performed, the processing may return to step S102.

As shown in FIG. 6, in the burst lead control processing in step S116, control amount read-out processing may first be performed (step S201). This control amount may be an EUV pulse energy control amount of the order corresponding to a burst pulse number Pb within the learning control region E1, and may be stored updatably in the control amount storage unit 23 by the energy control processing unit 20. In the first embodiment, this control amount may be determined based on an averaged output of the EUV pulse energy within the predetermined period Tw and the value of the burst pulse number Pb, and may be held in a relation table. Further, in step S201, the control amount read-out processing may be performed, in which the control amount of the EUV pulse energy corresponding to the averaged output at a given time tm0 is read out with reference to this relation table.

Figure 10:
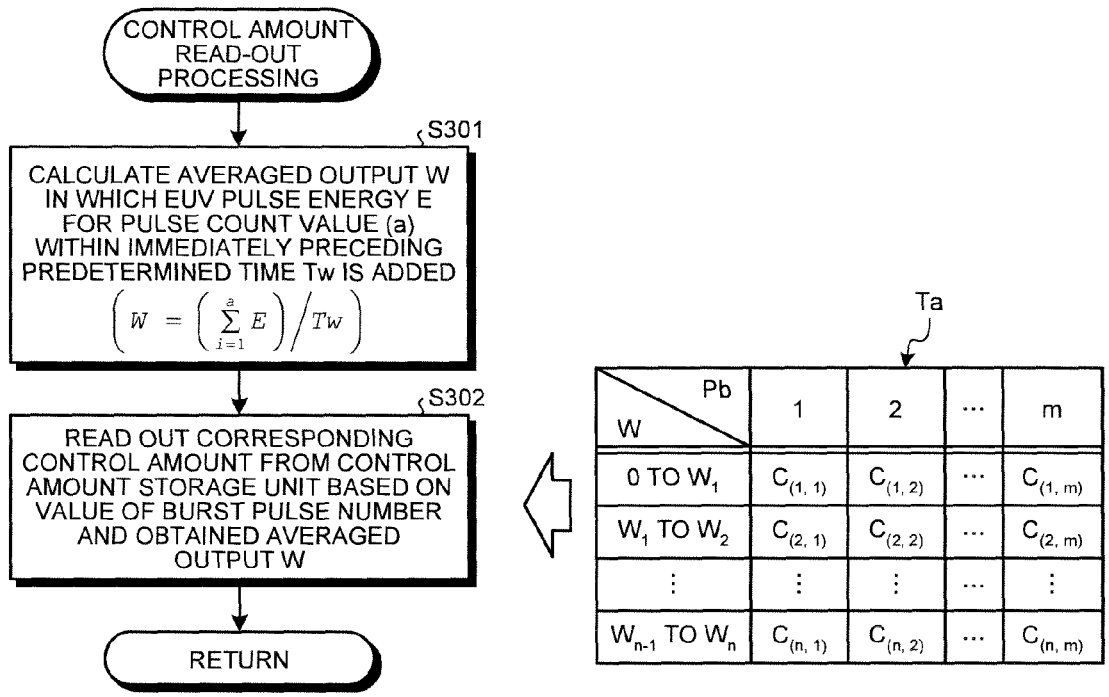
FIG. 10 is a flowchart showing control amount read-out processing procedure according to the first embodiment of this disclosure.

As shown in FIG. 10, in this control amount read-out processing, EUV pulse energy E for a count value of the number of pulses (the number of EUV pulses) within the predetermined time Tw obtained based on the history in the pulse history unit 21 may be added and an averaged output, in which the sum is divided by the predetermined time Tw, may be calculated (step S301). The averaged output W may be a parameter log, and may be calculated with the following Expression (1).

$$W = (\Sigma E)/Tw \tag{1}$$

If the predetermined time Tw is not obtained by the time tm0, it is preferable that EUV pulse energy for a count value of the number of pulses by the time tm0 may be added and an averaged output obtained by dividing the sum by a time by the time tm0 may be calculated as the averaged output W. However, the averaged output W may be directly calculated based on Expression (1).

Then, based on the calculated averaged output W and the value of the burst pulse number Pb, the corresponding control amount may be read out from the control amount storage unit 23 (step S302), and the processing may return to step S201.

For example, in the relation table stored in the control amount storage unit 23, in its initial state, control amounts preset for each EUV pulses up to the m-th pulse from the lead of the burst light emission within the range of averaged outputs W divided into n stages may be stored in a matrix, as shown in a relation table Ta in FIG. 10. For example, if a value of an averaged value W is within the range of "$W_1$ to $W_2$" for the lead EUV pulse (burst pulse number Pb=1), the control amount $C_{(2,1)}$ may be read out.

Referring again to FIG. 6, the energy control processing unit 20 may output an EUV pulse energy control signal S3 indicating the read-out control amount to the driver laser 1, and the $CO_2$ pulsed laser beam L1 may be outputted to have the EUV pulsed light emitted (step S202).

Subsequently, the energy control processing unit 20 detects the emitted EUV pulse energy based on the EUV pulse energy detection signal S2 (step S203), and updates the history in the pulse history unit 21 based on the detected EUV pulse energy (step S204). Then, control amount update processing for updating the relation table Ta in the control amount storage unit 23 may be performed based on the updated history in the pulse history unit 21 (step S205).

Figure 11:
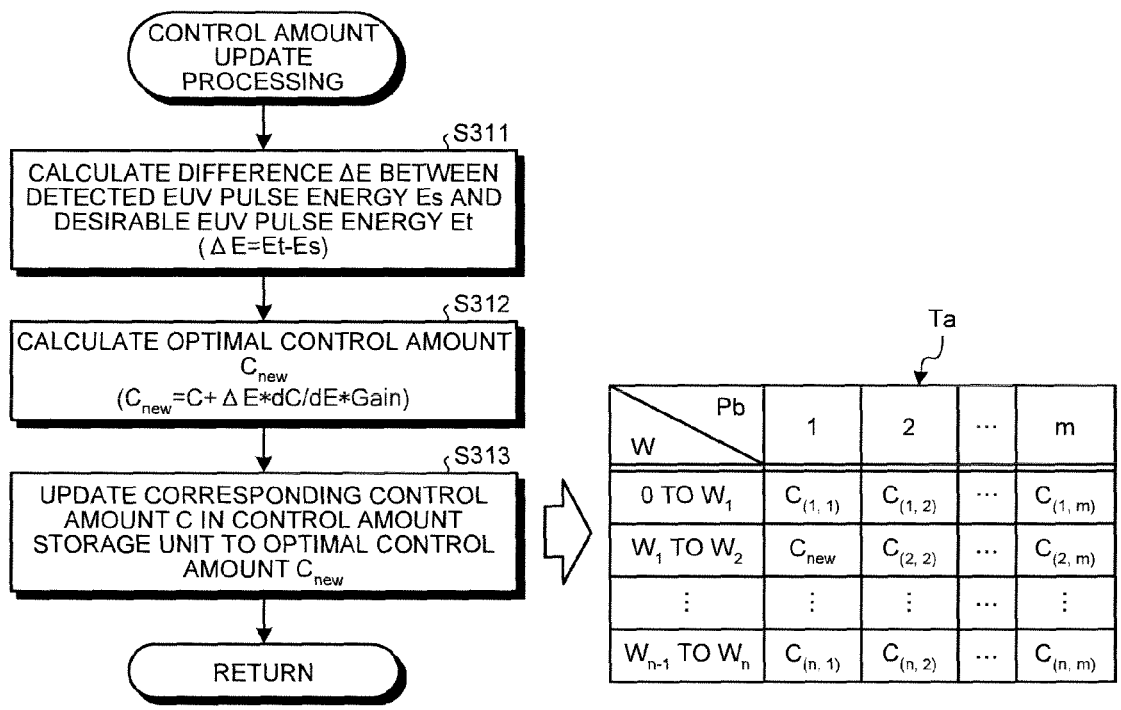
FIG. 11 is a flowchart showing control amount update processing procedure according to the first embodiment of this disclosure.

As shown in FIG. 11, in the control amount update processing, the energy control processing unit 20 may first calculate a difference $\Delta E$ between an EUV pulse energy Es detected in step S203 and a desirable EUV pulse energy Et (step S311).

Then, to reduce the difference $\Delta E$, the energy control processing unit 20 may calculate an optimal control amount $C_{new}$ as indicated by Expression (2) given below (step S312). $C_{new}$ may be calculated with Expression (2).

$$C_{new} = C + \Delta E * dC/dE * \text{Gain} \tag{2}$$

Then, the energy control processing unit 20 may update, to the calculated control amount $C_{new}$, a corresponding control amount C in the control amount storage unit 23 (step S313), and the processing may return to step S205. For example, if the value of the averaged output W as the parameter log is in "$W_1$ to $W_2$," and the pulse is the lead EUV pulse (burst pulse number Pb=1), the control amount $C_{(2,1)}$ in the relation table Ta may be updated to the optimal control amount $C_{new}$.

Referring back to FIG. 6, the energy control processing unit 20 may reset the trigger wait time T timed by the timer 22 to T=0 (step S206), and the processing may return to step S116.

As shown in FIG. 8, in this burst lead control processing, based on the averaged output W, which is the parameter log for the EUV pulse energy within the predetermined time Tw, the optimal control amount for the EUV pulse energy corresponding to the averaged output W may be selected for the each EUV pulse within the learning control region E1, and an EUV pulse may be emitted. Further, in the burst lead control processing, the energy control processing unit 20 may calculate such optimal control amount that would reduce the difference $\Delta E$ between a predetermined emitted EUV pulse energy Es and the desirable EUV pulse energy Et to update the control amount, and the energy control processing unit 20 may learn so that the EUV pulse, which should emit light when the averaged output W is in the same range, may be at the desirable EUV pulse energy Et.

Next, the feedback control processing in step S117 shown in FIG. 5 will be described with reference to the drawings. As shown in FIG. 7, the energy control processing unit 20 may first read out the control amount calculated based on the immediately preceding EUV pulse energy from the control amount storage unit 23 (step S211). Then, the energy control processing unit 20 may output the EUV pulse energy control signal S3 indicating the read-out control amount to the driver laser 1, to cause the $CO_2$ pulsed laser beam L1 to be oscillated and to have the EUV pulsed light emitted (step S212).

Then, the energy control processing unit 20 may detect the emitted EUV pulse energy based on the EUV pulse energy detection signal S2 (step S213), calculate a control amount based on the detected EUV pulse energy (step S214), and store the calculated control amount in the control amount storage unit 23.

Then, the energy control processing unit 20 may reset the trigger wait time T timed by the timer 22 to T=0 (step S215), and the processing may return to step S117.

As described above, in this feedback control processing, the output of the EUV pulse energy may be controlled so that the difference between the immediately preceding EUV pulse energy and the predetermined EUV pulse energy is reduced. To be more specific, as shown in FIG. 8, the processing may be performed for the EUV pulses within a feedback control region E2.

The history held in the pulse history unit 21 may be a time history of EUV pulse energy detection signals S2, as shown in FIG. 8(e). The history held in the pulse history unit 21 may be a time history from the time tm0 to the start of the predetermined time Tw, and the history before then may successively be deleted.

The averaged output W calculated in step S301 is a time average; however, since the predetermined time Tw is preset, the calculated value may not be divided by the predetermined time Tw, and an integrated value of EUV pulse energy within the predetermined time Tw may be used. Alternatively, an averaged value of EUV pulse energy may be used. Further, the number of EUV pulses may serve as the parameter log.

In the first embodiment, the configuration is such that the energy control processing unit 20 performs the energy control for one or more lead-side pulse energy including at least the first pulse of EUV pulses to be emitted subsequently based on the parameter log of the immediately preceding burst light emission, lead-side pulse energy at burst light emission can stably be controlled at a desirable value.

Second Embodiment

Figure 12:
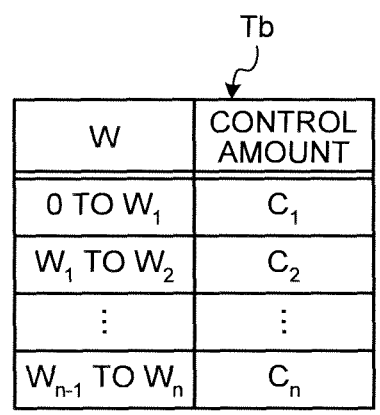
FIG. 12 shows an example of a relation table according to a second embodiment of this disclosure.

In the second embodiment, the burst lead control pulse number m may be 1. This is because the EUV pulse of the burst lead may vary largely from the value of the desirable EUV pulse energy according to the parameter log. FIG. 12 shows a relation table Tb stored in the control amount storage unit 23 in this case. In the relation table Tb, a control amount corresponding to a range of an averaged output W may be stored and updated only for an EUV pulse of a burst lead Accordingly, the feedback control processing in step S117 may be performed for the second and the subsequent EUV pulses counted from the burst lead.

Third Embodiment

In the above-described first embodiment, the configuration is such that the control amount is read out using the relation table stored in the control amount storage unit 23, and the control amount is updated; however, in the third embodiment, the configuration may be such that the burst lead control processing is performed by having the control amount read out using a relational expression indicative of the control amount corresponding to an averaged output W and having the control amount updated.

Figure 13:
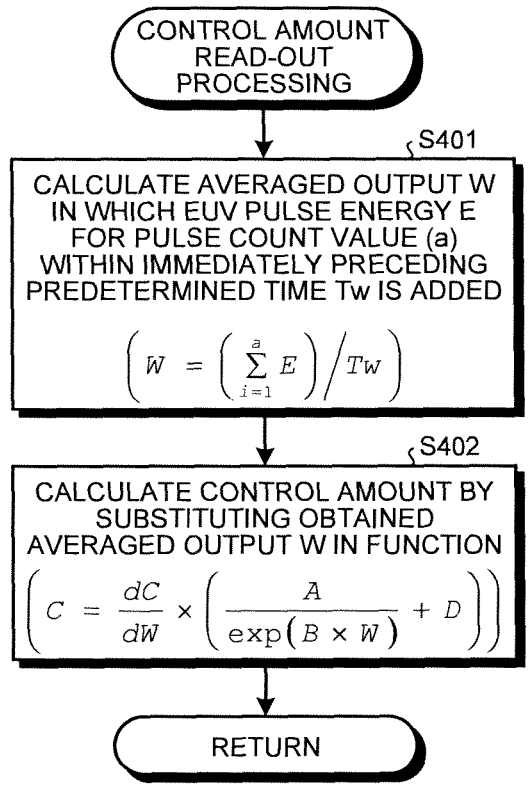
FIG. 13 is a flowchart showing control amount read-out processing procedure according to a third embodiment of this disclosure.
Figure 14:
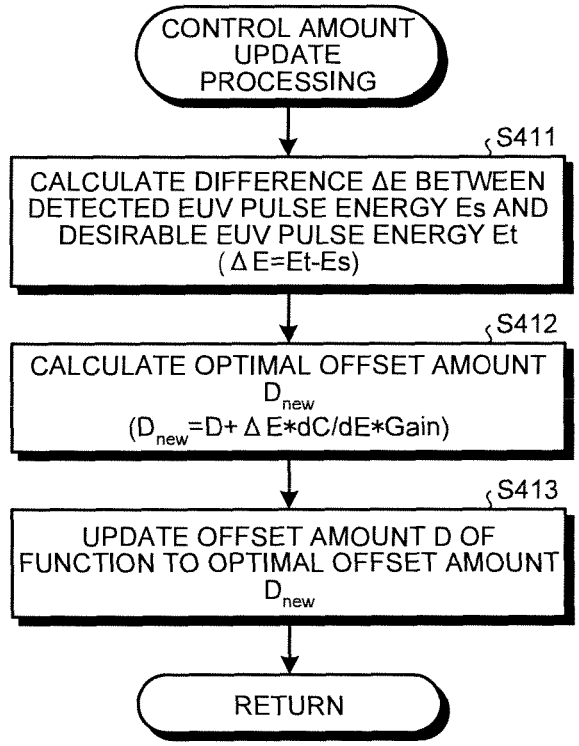
FIG. 14 is a flowchart showing control amount update processing procedure according to the third embodiment of this disclosure.

FIG. 13 is a flowchart showing control amount read-out processing procedure in the burst lead control processing according to the third embodiment. Also, FIG. 14 is a flowchart showing the control amount update processing procedure in the burst lead control processing according to the third embodiment.

In the control amount read-out processing shown in FIG. 13, similarly to step S301, an averaged output W may be calculated as a parameter log (step S401). Then, the obtained averaged output W may be applied to the relational expression indicated by Expression (3) for the control amount C with the averaged output W serving as a variable, whereby the control amount may be calculated (step S402), and the processing may return to step S201.

$$C = (dC/dW)*(A/\exp(B \times W) + D) \quad (3)$$

In Expression (3), A and B are constants, and D is an offset amount. The relational expression for the control amount C may be set for each EUV pulse from the lead within the learning control region E1. In other words, the relational expressions may be set for the number of pulses corresponding to the burst lead control pulse number m.

Also, in the control amount update processing shown in FIG. 14, similarly to step S311, the difference $\Delta E$ between the detected EUV pulse energy Es and the desirable EUV pulse energy Et may be calculated (step S411). Then, an optimal offset amount $D_{new}$ for reducing the difference $\Delta E$ may be calculated using the following Expression (4) (step S412).

$$D_{new} = D + \Delta E * dC/dE * \text{Gain} \quad (4)$$

Then, an offset amount D in the relational expression may be updated to the calculated optimal offset amount $D_{new}$ (step S413), and the processing may return to step S205.

Fourth Embodiment

In the above-described first embodiment, the configuration is such that the control amount is read out using the averaged output W within the predetermined time Tw as the parameter log and the control amount is updated, whereby the burst lead control processing is performed; however, in the fourth embodiment, the configuration may be such that a control amount is read out using the immediately preceding burst-length time TB shown in FIG. 8 as the parameter log and the control amount is updated. In other words, in the fourth embodiment, when the burst light emission is performed, the burst-length time TB of the immediately preceding burst light emission that may affect the burst light emission to be controlled may be used as the parameter log.

Figure 15:
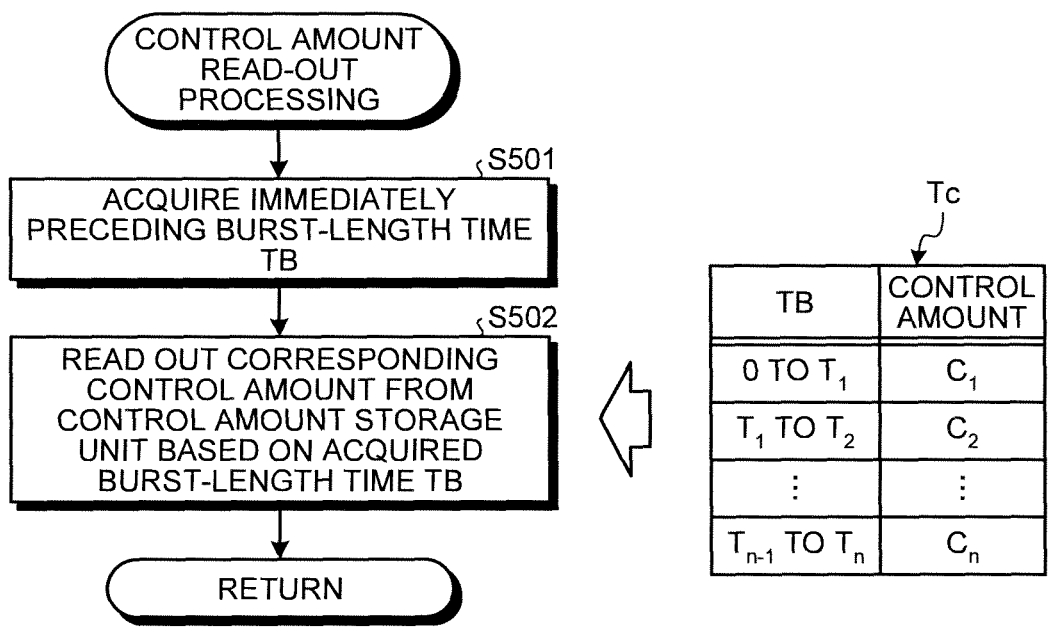
FIG. 15 is a flowchart showing control amount read-out processing procedure according to a fourth embodiment of this disclosure.
Figure 16:
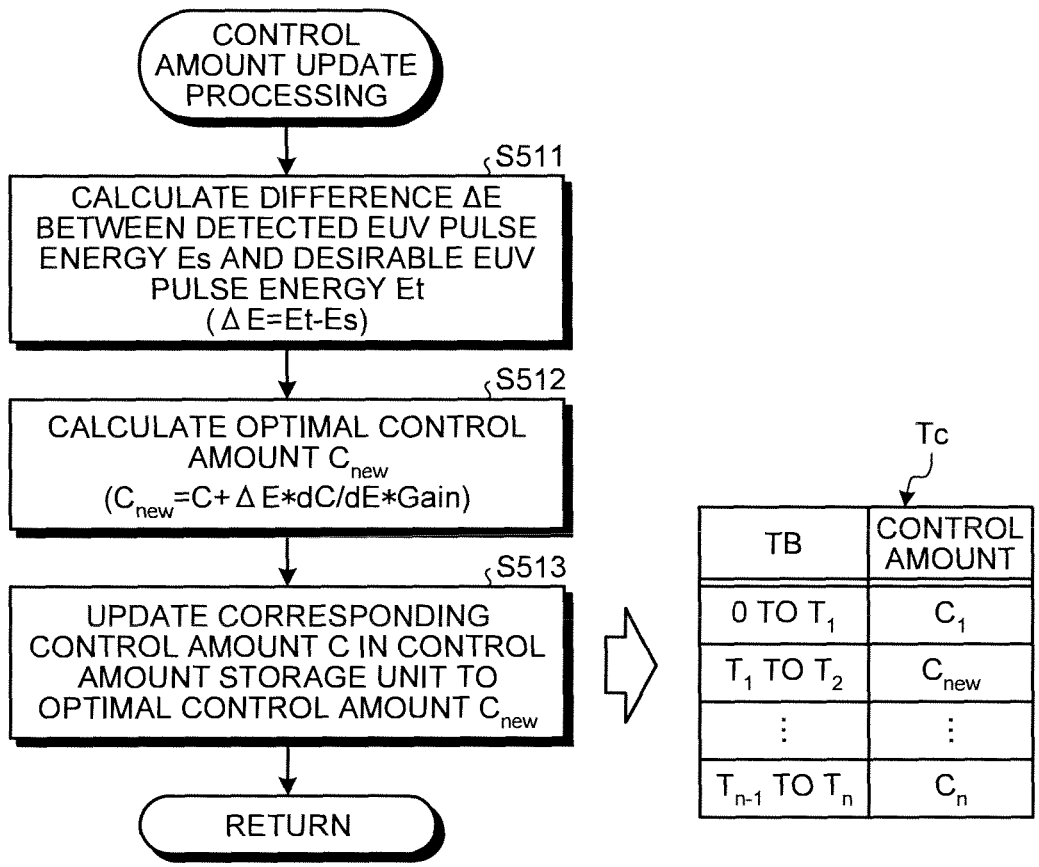
FIG. 16 is a flowchart showing control amount update processing procedure according to the fourth embodiment of this disclosure.

FIG. 15 is a flowchart showing the control amount read-out processing procedure in the burst lead control processing according to the fourth embodiment. FIG. 16 is a flowchart showing the control amount update processing procedure in the burst lead control processing according to the fourth embodiment.

In the control amount read-out processing shown in FIG. 15, the immediately preceding burst-length time TB may be acquired from the history in the pulse history unit (step S501). Then, based on the value of the acquired burst-length time TB, the corresponding control amount may be read out from a relation table Tc stored in the control amount storage unit 23 (step S502), and the processing may return to step S201.

Here, in the relation table Tc, control amounts $C_1, C_2, \ldots, C_{n-1}, C_n$ may be set respectively, for example, for an n number of ranges (0 to $T_1$, $T_1$ to $T_2$, ..., $T_{n-1}$ to $T_n$) of the burst-length time TB for the burst lead pulses. Then, for example, if the acquired burst-length time TB is within the range of $T_1$ to $T_2$, the control amount $C_2$ may be read out.

Further, in the control amount update processing shown in FIG. 16, similarly to step S311, the difference $\Delta E$ between the detected EUV pulse energy Es and the desirable EUV pulse energy Et may be calculated (step S511). Then, to reduce the difference $\Delta E$, an optimal control amount C may be calculated using the difference $\Delta E$ with Expression (2) (step S512).

The corresponding control amount C may be updated to the calculated optimal control amount $C_{new}$ (step S513), and the processing may return to step S205. For example, when the optimal control amount $C_{new}$ corresponding to the control amount $C_2$ is calculated, overwriting processing for updating the control amount $C_2$ to the optimal control amount $C_{new}$ may be performed.

Fifth Embodiment

In the above-described first embodiment, the configuration is such that the control amount is read out using the averaged output W within the predetermined time Tw as the parameter log and the control amount is updated, whereby the burst lead control processing is performed. In the fifth embodiment, the configuration may be such that the control amount is read out using the immediately preceding burst-rest time Tr shown in FIG. 8 as the parameter log, and the controlled amount is updated. In other words, in the fifth embodiment, when the burst light emission is performed, the burst-rest time Tr, which is a light emission rest time since the completion of the immediately preceding burst light emission that may affect the burst light emission to be controlled, may be used as the parameter log.

Figure 17:
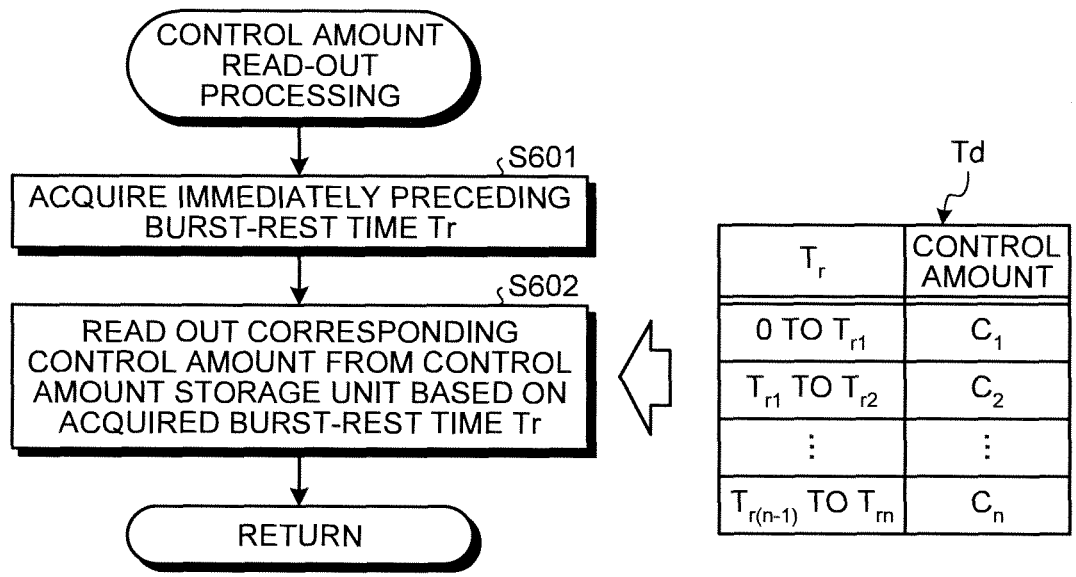
FIG. 17 is a flowchart showing control amount read-out processing procedure according to a fifth embodiment of this disclosure.
Figure 18:
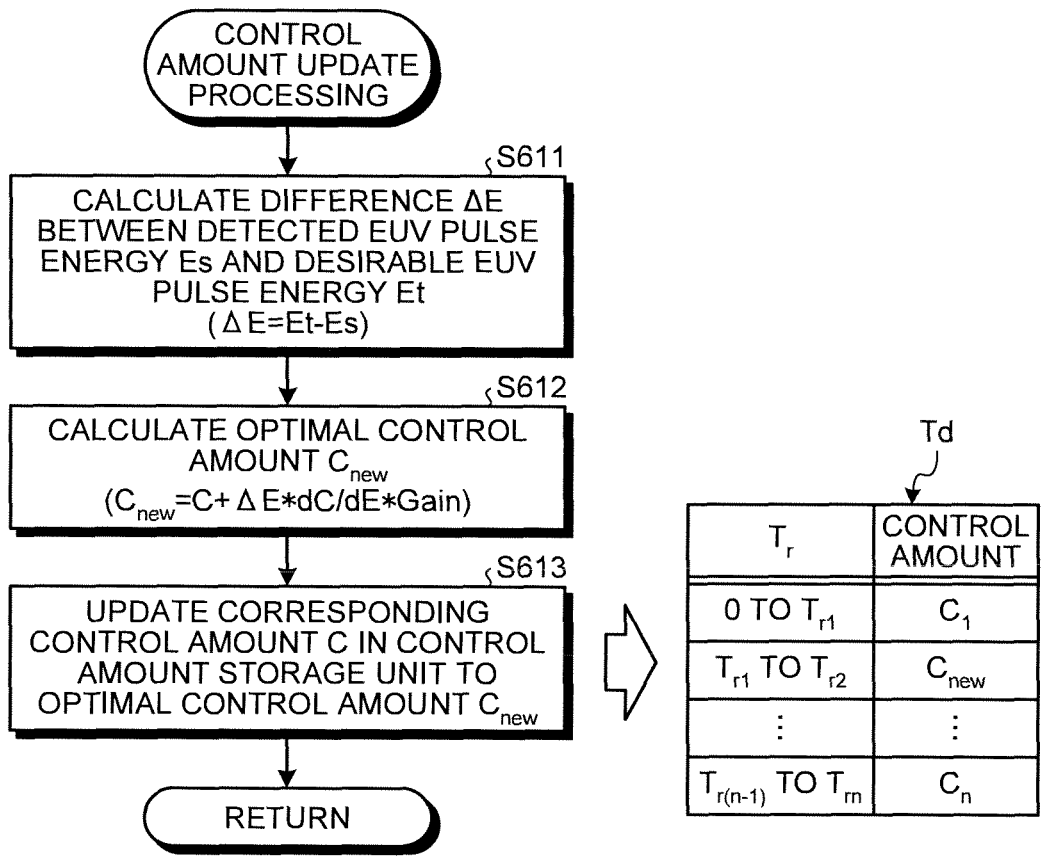
FIG. 18 is a flowchart showing control amount update processing procedure according to the fifth embodiment of this disclosure.

FIG. 17 is a flowchart showing the control amount read-out processing procedure in the burst lead control processing according to the fifth embodiment. FIG. 18 is a flowchart showing the control amount update processing procedure in the burst lead control processing according to the fifth embodiment.

In the control amount read-out processing shown in FIG. 17, the immediately preceding burst-rest time Tr may first be acquired from the history in the pulse history unit 21 (step S601). Then, based on the value of the acquired burst-rest time Tr, the corresponding control amount may be read out from a relation table Td stored in the control amount storage unit 23 (step S602), and the processing may return to step S201.

In the relation table Td, control amounts $C_1, C_2, \ldots, C_{n-1}, C_n$ may be set respectively, for example, for an n number of ranges (0 to $Tr_1$, $Tr_1$ to $Tr_2$, ..., $Tr_{n-1}$ to $Tr_n$) of the burst-rest time Tr for the burst lead pulses. Then, for example, if the acquired burst-rest time Tr is within the range of $Tr_1$ to $Tr_2$, the control amount $C_2$ may be read out.

Also, in the control amount update processing shown in FIG. 18, similarly to step S311, the difference ΔE between the detected EUV pulse energy Es and the desirable EUV pulse energy Et may be calculated (step S611). Then, to reduce the difference ΔE, an optimal control amount $C_{new}$ may be calculated using the difference ΔE with Expression (2) (step S612).

Then, the corresponding control amount C may be updated to the calculated optimal control amount $C_{new}$ (step S613), and the processing may return to step S205. For example, if the optimal control amount $C_{new}$ corresponding to the control amount $C_2$ is calculated, overwriting processing for updating the control amount $C_2$ to the optimal control amount $C_{new}$ may be performed.

Sixth Embodiment

In the above-described fourth embodiment, the configuration is such that the control amount is read out from the relation table Tc using the immediately preceding burst-length time TB as the parameter log and the control amount is updated. In the sixth embodiment, instead of the relation table Tc, similarly to the third embodiment, the configuration may be such that the control amount may be read out using the relational expression indicative of the control amount corresponding to the immediately preceding burst-length time TB, and the control amount may be updated.

Figure 19:
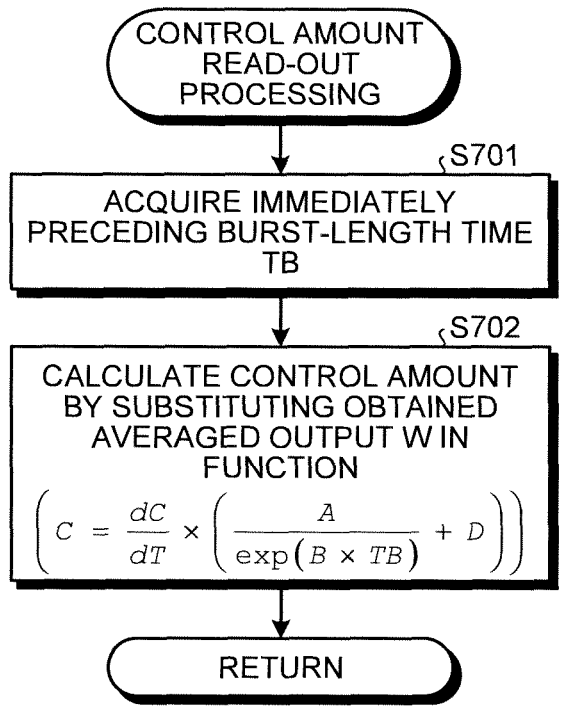
FIG. 19 is a flowchart showing control amount read-out processing procedure according to a sixth embodiment of this disclosure.
Figure 20:
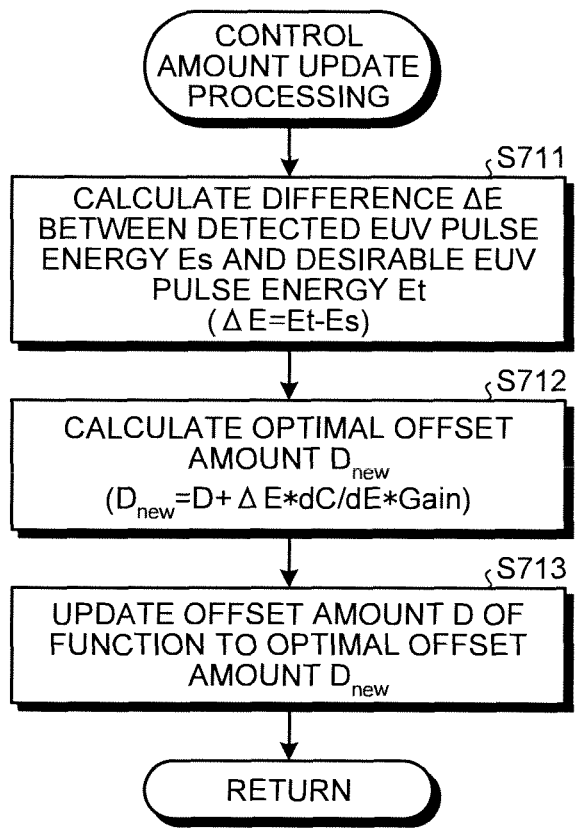
FIG. 20 is a flowchart showing control amount update processing procedure according to the sixth embodiment of this disclosure.

FIG. 19 is a flowchart showing the control amount read-out processing procedure in the burst lead control processing according to the sixth embodiment. FIG. 20 is a flowchart showing the control amount update processing procedure in the burst lead control processing according to the sixth embodiment.

In the control amount read-out processing shown in FIG. 19, the immediately preceding burst-length time TB may be acquired from the history in the pulse history unit (step S701). Then, the acquired burst-length time TB may be inputted to a relational expression indicative of the relationship of the control amount with respect to the burst-length time TB, the relational expression being shown in Expression (5) stored in the control amount storage unit 23; the corresponding control amount may be calculated (step S702); and the processing may return to step S201.

$$C=(dC/dT)*(A/\exp(B\times TB)+D) \qquad (5)$$

In Expression (5), A and B are constants, and D is an offset amount. The relational expression for the control amount C may be set for each EUV pulse from the lead within the learning control region E1. In other words, the relational expressions may be set for the number of pulses corresponding to the burst lead control pulse number m.

Also, in the control amount update processing shown in FIG. 20, similarly to step S311, the difference ΔE between the detected EUV pulse energy Es and the desirable EUV pulse energy Et may be calculated (step S711). Then, the optimal offset amount $D_{new}$ for reducing the difference ΔE may be calculated with Expression (4) (step S712). Then, the offset amount D in the relational expression may be updated to the calculated optimal offset amount $D_{new}$ (step S713), and the processing may return to step S205.

In the sixth embodiment, the configuration is such that the control amount is obtained based on the relational expression using the burst-length time TB as the parameter log; however, the configuration may be such that the control amount may be obtained with a relational expression using the burst-rest time Tr, instead of the burst-length time TB, as the parameter log.

Seventh Embodiment

In the seventh embodiment, the configuration may be such that a control amount is read out from a relation table Te for control amounts set based on a matrix of the averaged output W and the burst-length time TB, with the averaged output W within the predetermined time Tw and the burst-length time TB being used as the parameter logs, and the control amount is updated, whereby burst lead control processing is performed. If the burst lead control pulse number m is plural, a plurality of relation tables may be used.

Figure 21:
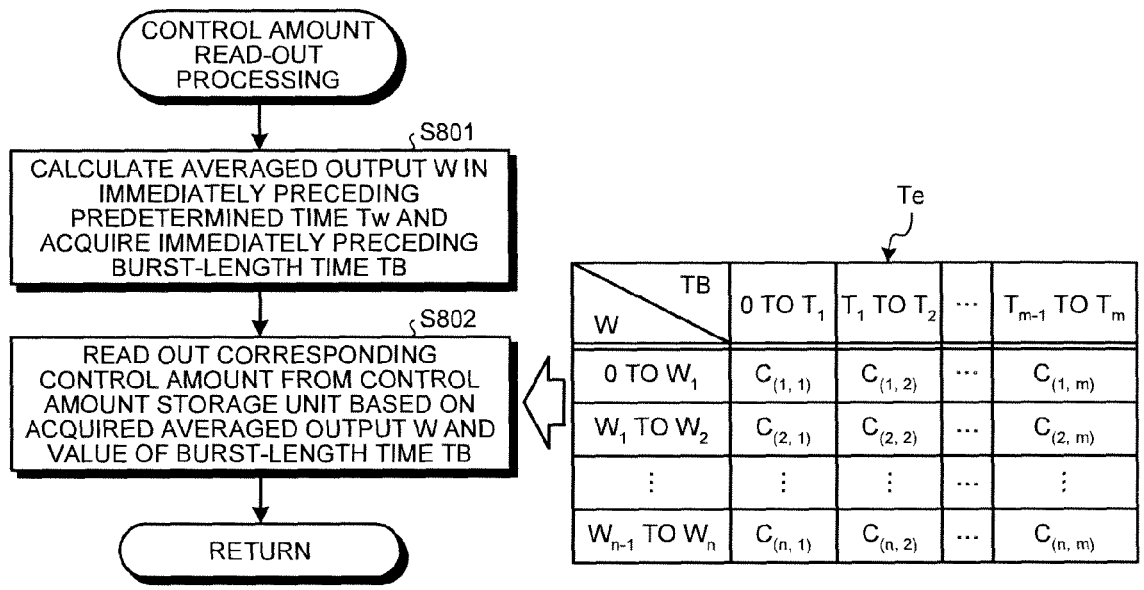
FIG. 21 is a flowchart showing control amount read-out processing procedure according to a seventh embodiment of this disclosure.
Figure 22:
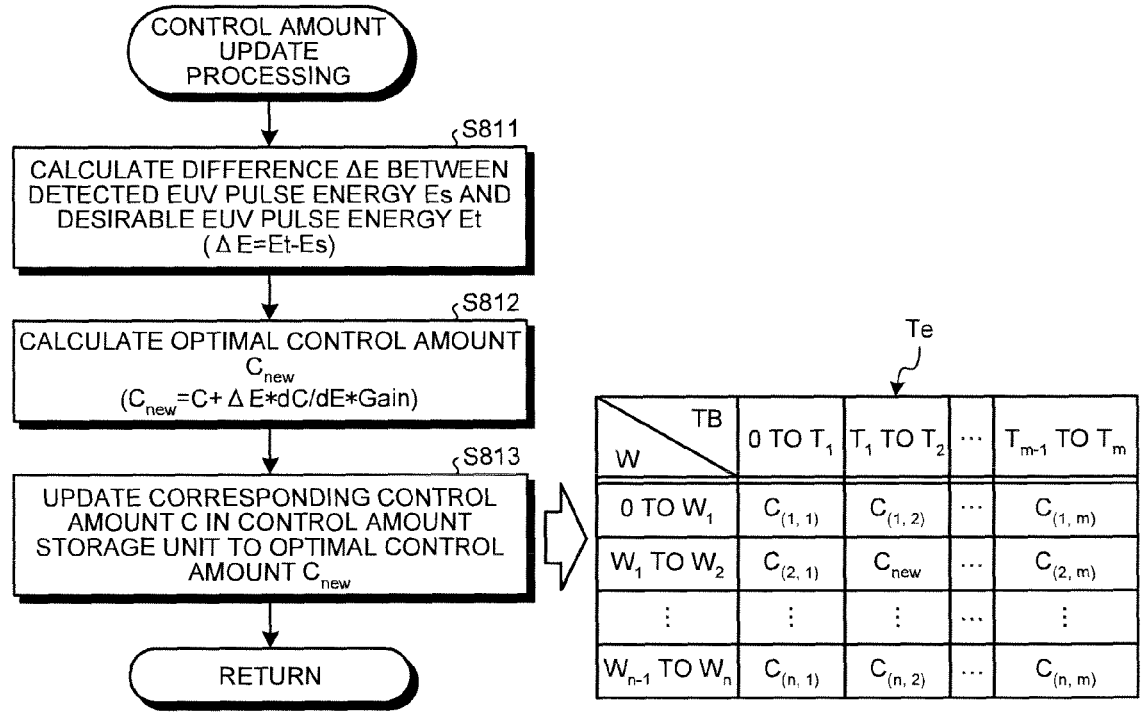
FIG. 22 is a flowchart showing control amount update processing procedure according to the seventh embodiment of this disclosure.

FIG. 21 is a flowchart showing the control amount read-out processing procedure in the burst lead control processing according to the seventh embodiment. FIG. 22 is a flowchart showing the control amount update processing procedure in the burst lead control processing according to the seventh embodiment.

In the control amount read-out processing shown in FIG. 21, the averaged output W and the immediately preceding burst-length time TB may be acquired from the history in the pulse history unit 21 (step S801). Then, the corresponding control amount may be read out from the relation table Te stored in the control amount storage unit 23, based on the acquired averaged output W and the burst-length time TB (step S802), and the processing may return to step S201.

Further, in the control amount update processing shown in FIG. 22, the difference ΔE between the detected EUV pulse energy Es and the desirable EUV pulse energy Et may be calculated (step S811). Then, to reduce the difference ΔE, an optimal control amount $C_{new}$ may be calculated using the difference ΔE with Expression (2) (step S812).

Then, the corresponding control amount C may be updated to the calculated optimal control amount $C_{new}$ (step S813), and the processing may return to step S205. For example, if the value of the control amount C set when the value of the averaged output W is within the range of $W_1$ to $W_2$ and the value of the burst-length time TB within the range of $T_1$ to $T_2$ is $C_{(2,2)}$, when an optimal control amount $C_{new}$ corresponding to this control amount $C_{(2,2)}$ is calculated, overwriting processing for updating the control amount $C_{(2,2)}$ to the optimal control amount $C_{new}$ may be performed.

If a control amount is calculated using a relational expression instead of a relation table, this relational expression may be a function in which the control amount C is determined with the averaged output W and the burst-length time TB being used as variables. IF the burst lead control pulse number m is plural, a plurality of relation tables may be used. The burst-rest time Tr may be used instead of the burst-length time TB, or a relation table of a three-dimensional matrix with the burst-rest time Tr added or a function in which a control amount C is determined by a relational expression determined by three variables including the averaged output W, the burst-length time TB, and the burst-rest time Tr may be used.

In these first through seventh embodiments, the configuration is such that the control amount C of at least a single lead-side EUV pulse determined by one of the averaged output W of the EUV pulse energy within the predetermined time Tw, the burst-length time TB, and the burst-rest time Tr or a combination of at least two of these may be read out and updated, and the burst lead control processing is performed in which the learning control is performed for the at least single lead-side EUV pulse energy to be burst-emitted next. Accordingly, the value of the lead-side EUV pulse energy does not become a value largely deviated from the desirable EUV pulse energy, and stable burst light emission can be performed.

Figure 23:
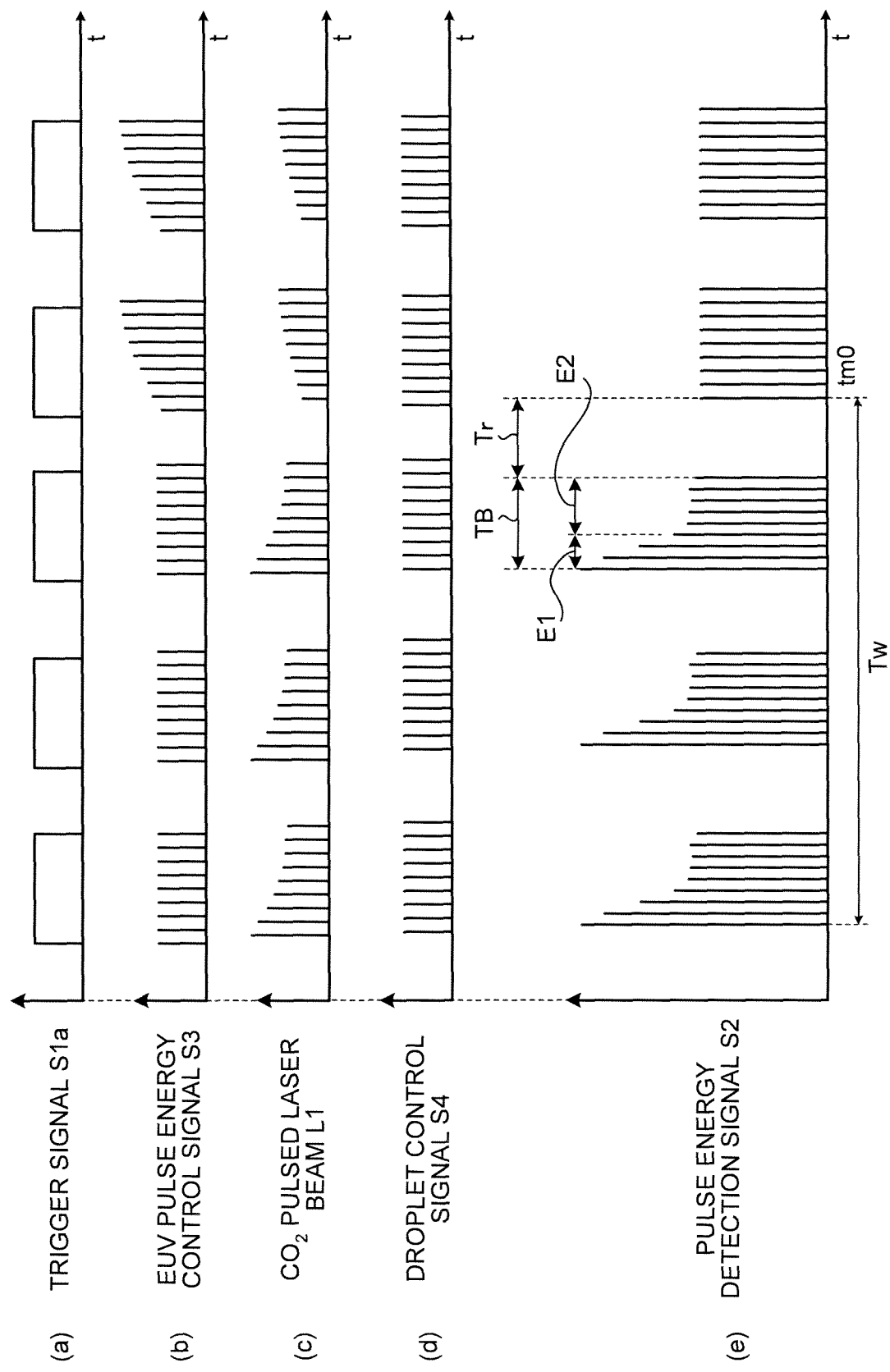
FIG. 23 schematically shows change in signals at successive burst light emission, in a case where a trigger signal is a signal indicating a burst light emission period.
Figure 24:
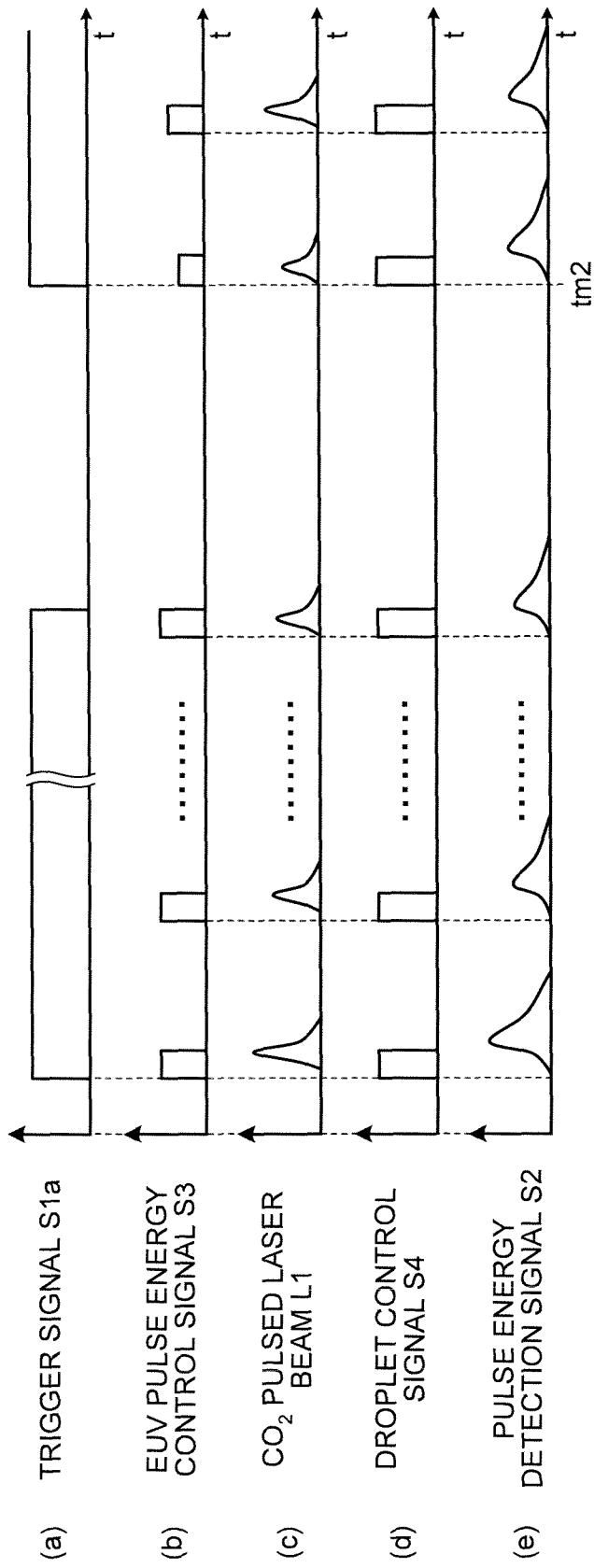
FIG. 24 is a time chart showing, in enlargement, the change in signals between two burst light emission shown in FIG. 23.

In the above-described first through seventh embodiments, the configuration is such that the trigger signal S1 is indicated on each pulse in burst light emission. In contrast, as shown in FIGS. 23 and 24, a trigger signal S1a indicated on each burst may be used instead of the trigger signal S1 from the exposure apparatus 100. In this case, the energy control processing unit 20 may be configured to generate an EUV pulse energy control signal S3 based on rising timing of the trigger signal S1a. A repetition rate within the burst of the EUV pulse energy control signal S3 may be held in the EUV light source controller C in advance or may be designated by the exposure apparatus 100. The generated EUV pulse energy control signal S3 may be inputted to the driver laser 1 and to the pulse history unit 21 and the timer 22 as well. The pulse history unit 21 may treat the EUV pulse energy control signal S3 as the trigger signal S1 and may save the history of the EUV pulse energy. Also, the timer 22 may treat the EUV pulse energy control signal S3 as the trigger signal S1 and may perform timing processing. In other words, even with the trigger signal S1a indicative of each burst light emission period, as long as the energy control processing unit 20 generates EUV pulse energy control signals S3 corresponding to second and later trigger signals S1a (or first and later trigger signals S1a), processing similar to any of the above-described first through seventh embodiments can be performed.

First Modification

Figure 25:
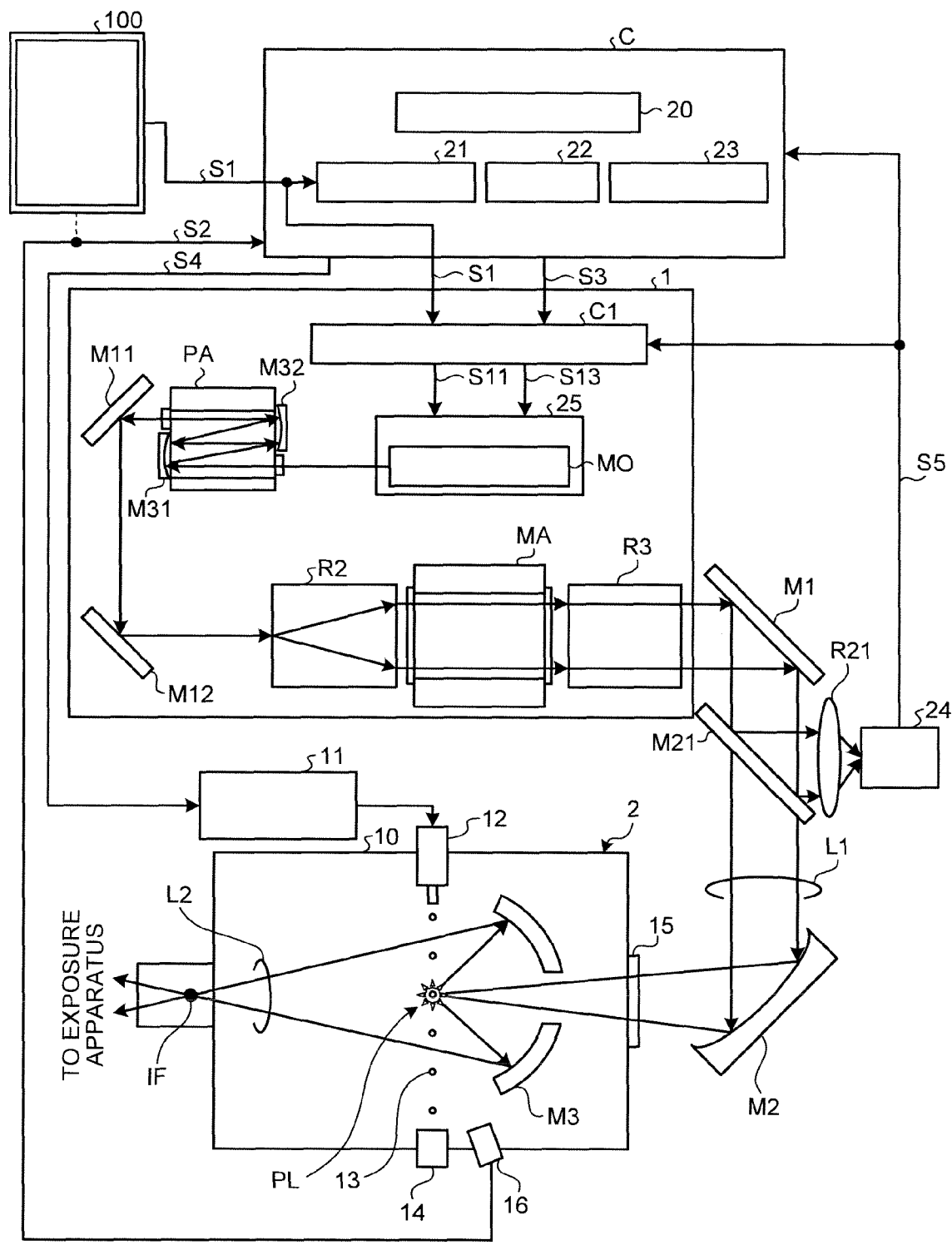
FIG. 25 schematically illustrates a configuration of the EUV light generation system according to a modification of this disclosure.

In the first modification, a detailed control configuration of a driver laser 1 that is controlled by the EUV light source controller C according to any of the above-described first through seventh embodiments will be described. As shown in FIG. 25, the driver laser 1 may include an oscillator 25 including a master oscillator MO such as a semiconductor laser that oscillates a longitudinal-mode pulsed laser beam in gain bandwidths of a preamplifier PA and a main amplifier MA, and the preamplifier PA and the main amplifier MA that successively amplify the pulsed laser beam outputted from the oscillator 25. Also, the driver laser 1 may include a driver laser controller C1. The driver laser controller C1 may output to the oscillator 25 a trigger signal S11 and a laser pulse energy control signal S13 that control the oscillation of the $CO_2$ pulsed laser beam L1 from the oscillator 25, based on a trigger signal S1 and an EUV pulse energy control signal S3 outputted from an EUV light source controller C.

The preamplifier PA may be a slab amplifier. The laser beam outputted from the oscillator 25 may be incident on an input window of the preamplifier PA. The preamplifier PA may include an amplification region, amplify the inputted laser beam through multipass-amplification with mirrors M31 and M32 in the amplification region, and output the amplified laser beam through an output window toward an HR (high reflection) mirror M11. In this way, the single longitudinal-mode pulsed laser beam may pass through the amplification region filled with a gain medium within the preamplifier PA to be further amplified efficiently, and be outputted therefrom.

The amplified pulsed laser beam outputted from the preamplifier PA may be reflected by the HR mirrors M11 and M12, and may enter a relay optical system R2. The relay optical system R2 may expand a beam width or diameter of the amplified pulsed laser beam so that the amplified pulsed laser beam enters an amplification region of the main amplifier MA filled with mixed gas serving as a gain medium for the $CO_2$ laser beam so as to have the space filled with the amplified pulsed laser beam. With this, the amplified pulsed laser beam may pass through the amplification region filled with the gain medium within the main amplifier MA to be further amplified efficiently, and be outputted.

Then, the amplified pulsed laser beam outputted from the main amplifier MA may be collimated by a relay optical system R3. The collimated laser beam may be reflected with high reflectivity by the HR mirror M1 and the off-axis paraboloidal mirror M2, and may enter the EUV chamber 10 of the EUV light generation apparatus 2 through the window 15.

Here, an optical element M21, which is configured of a partial reflection mirror or a beam splitter for detecting the output of the $CO_2$ pulsed laser beam L1, may be provided between the HR mirror M1 and the off-axis paraboloidal mirror M2. The laser beam reflected by the optical element M21 may be focused by a focusing lens R21, and thereafter the output of the $CO_2$ pulsed laser beam L1 may be detected by a laser beam detector 24. The pulse energy of the $CO_2$ pulsed laser beam L1 detected by the laser beam detector 24 may be inputted as a laser pulse energy detection signal S5 to the EUV light source controller C and to the driver laser 1.

The driver laser controller C1 may output a trigger signal S11 and a laser pulse energy control signal S13 to the oscillator 25, and thus perform energy control for the pulsed laser beam to be inputted into the preamplifier PA. At this time, the driver laser controller C1 may control the driver laser 1 based on the inputted laser pulse energy detection signal S5. The control for the EUV pulse energy outputted from the EUV light generation apparatus 2 may be performed by the high-order EUV light source controller C.

That is, in the first modification, the configuration may be such that oscillation timing, an oscillation wavelength, and an oscillation waveform of the pulsed laser beam inputted to the preamplifier PA are controlled.

Figure 26:
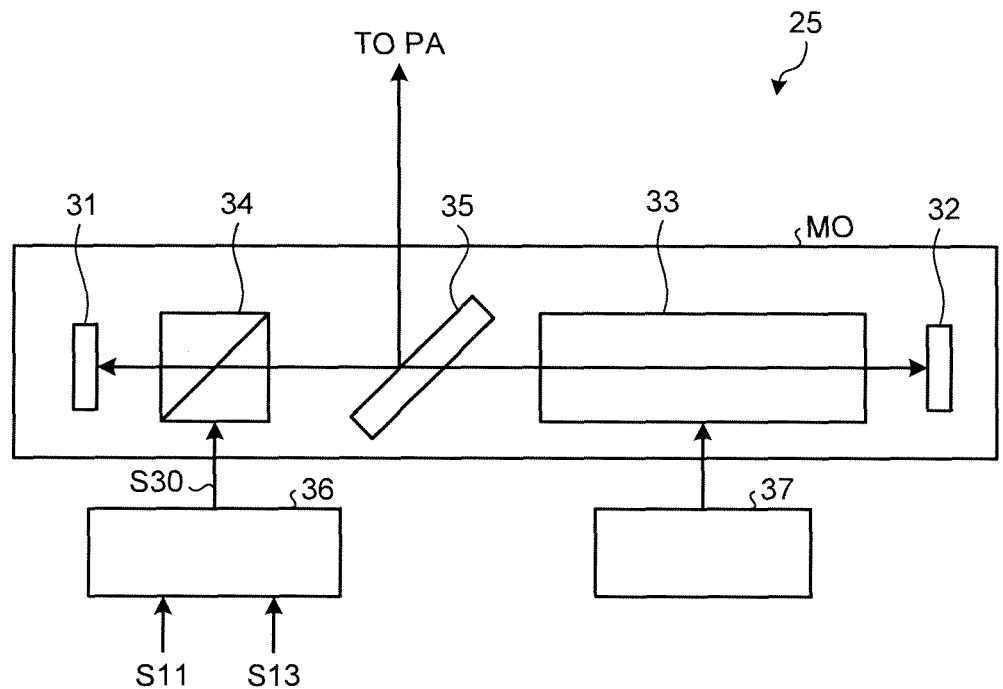
FIG. 26 schematically illustrates an example of an oscillator shown in FIG. 25.

As shown in FIG. 26, the master oscillator MO, for example, may be configured such that a Pockels cell 34, a polarizer 35, and a $CO_2$ gain medium 33 are arranged between a pair of resonator mirrors 31 and 32 in that order from the resonator mirror 31 side. The $CO_2$ gain medium 33 may be excited in a predetermined state with voltage of a constant frequency being applied from a laser power supply 37. The polarizer 35, for example, may transmit P-polarized component of a laser beam with respect thereto. A Pockels cell control power supply 36 may output to the Pockels cell an oscillation control signal S30 for generating a predetermined pulse shape at predetermined timing based on the trigger signal S11 and the laser pulse energy control signal S13. The Pockels cell 34 with voltage being applied thereto may rotate the polarization of the laser beam incident thereon while predetermined voltage or higher is applied thereto. First, in a state in which voltage is not applied to the Pockels cell 34 based on the oscillation control signal S30, the linearly polarized $CO_2$ laser beam is transmitted through the Pockels cell 34 without having the polarization thereof rotated; thus, the $CO_2$ laser beam is incident on the polarizer 35 as the P-polarized component and is not outputted toward the preamplifier PA. Here, when predetermined or higher voltage is applied to the Pockels cell 34 for a predetermined period based on the oscillation control signal S30, the amplified $CO_2$ laser beam incident on the Pockels cell 34 may be converted to a laser beam of S-polarized component with respect to the polarizer 35 by the Pockels cell 34, and be reflected by the polarizer 35 to be outputted toward the preamplifier PA. The laser pulse energy outputted from the polarizer 35 toward the preamplifier PA may be controlled by adjusting the length of the predetermined period during which voltage is applied by the Pockels cell control power supply 36.

Figure 27:
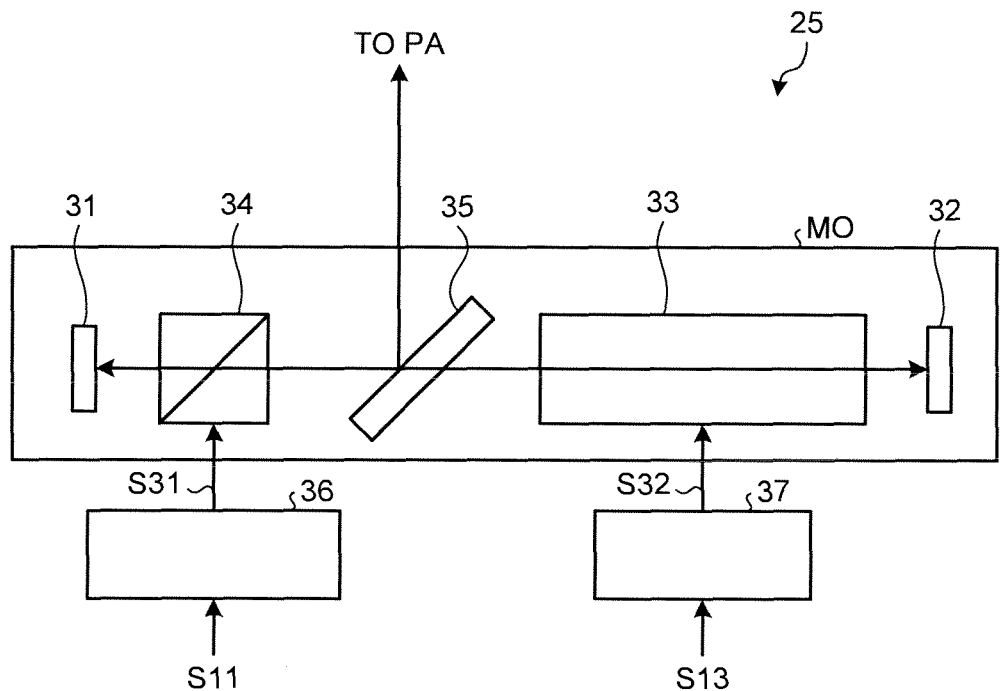
FIG. 27 schematically illustrates another example of an oscillator shown in FIG. 25.

In the oscillator shown in FIG. 26, the configuration is such that the laser pulse energy is controlled by controlling the predetermined period during which the voltage is applied from the Pockels cell control power supply 36 to the Pockels cell 34. In contrast, as shown in FIG. 27, the Pockels cell control power supply 36 may apply to the Pockels cell 34 a control signal S31 for applying voltage for a predetermined period based only on the trigger signal S11, and the laser power supply 37 may output a voltage control signal S32 for controlling the excited state of the $CO_2$ gain medium 33 based on the pulse energy control signal S13 inputted to the laser power supply 37. As a result, the laser pulse energy outputted from the polarizer 35 toward the preamplifier PA may be controlled.

Figure 28:
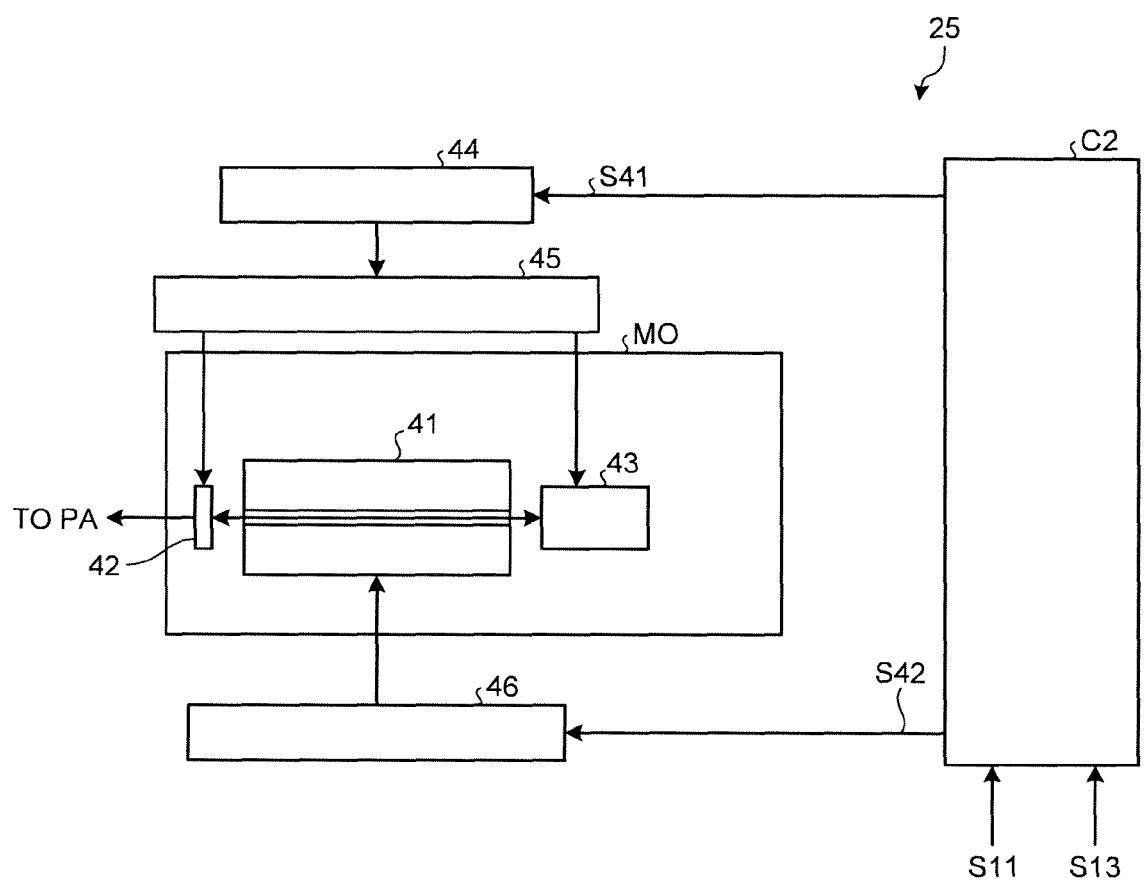
FIG. 28 schematically illustrates an example of an oscillator shown in FIG. 25, the oscillator being configured of semiconductor lasers.

Also, as shown in FIG. 28, a semiconductor laser may be used as the master oscillator MO. The semiconductor laser may preferably be a quantum-cascade laser. An output coupling mirror 42 may be provided at the front side of the master oscillator MO, and a rear optical module 43 may be provided at the rear side. The output coupling mirror 42 and the rear optical module 43 may form an optical resonator with a semiconductor device 41 having an optical amplification region arranged therebetween. This optical resonator may be controlled by a semiconductor laser controller C2. The semiconductor laser controller C2 may output an oscillation wavelength signal S41 to a longitudinal-mode control actuator 45 through a longitudinal-mode controller 44. This longitudinal-mode control actuator 45 may control a wavelength of a laser beam outputted from the optical resonator. Also, the semiconductor laser controller C2 may output an oscillation pulse shape signal S42 to a current control actuator 46 based on the trigger signal S11 and the laser pulse energy control signal S13. This current control actuator 46 may control a current waveform that is applied to the semiconductor device 41, and may control a pulse shape of the pulsed laser beam outputted from the optical resonator and the timing at which the pulsed laser beam is outputted. This pulsed laser beam of which the pulse shape and the output timing are controlled may be inputted to the preamplifier PA. The pulse shape may include a pulse width and a pulse peak value, and hence by controlling the pulse shape, the pulse energy can be controlled.

It is to be noted that the output coupling mirror 42 may be a mirror treated with partial reflection mirror coating. The output coupling mirror 42 may output a laser beam, and may also return part of the laser beam into the optical resonator for resonant amplification. The rear optical module 43 may include a collimator lens and a grating with the Littrow arrangement for selecting a predetermined wavelength of the laser beam. The laser beam outputted from the rear side of the semiconductor device 41 is collimated by the collimator lens, and outputted as a collimated beam toward the grating, and the laser beam the wavelength of which is selected by the grating is returned to the semiconductor device 41 through the collimator lens. With this, the desirable single longitudinal-mode laser beam can be outputted from the output coupling mirror 42 toward the preamplifier PA.

Further, in the above-described first modification, the laser pulse energy is controlled by having the master oscillator MO being controlled; however, the configuration may be such that the laser pulse energy inputted to the preamplifier PA may be controlled in the oscillator 25 but outside the master oscillator MO. In this case, a laser beam with predetermined laser pulse energy may be outputted from the master oscillator MO.

Figure 29:
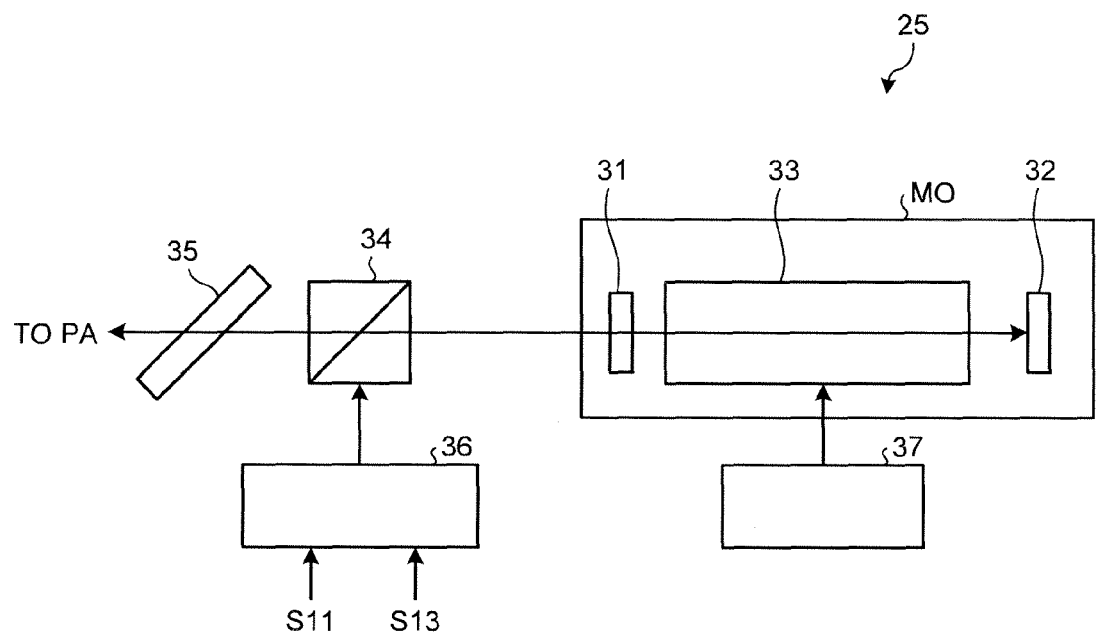
FIG. 29 schematically illustrates an example of an oscillator shown in FIG. 25, the oscillator being provided with a high-speed shutter on the exterior thereof.

For example, as shown in FIG. 29, the Pockels cell 34 and the polarizer 35 shown in FIG. 26 may be provided outside the master oscillator MO. In particular, the Pockels cell 34 and the polarizer 35 may be provided outside the front-side resonator mirror 31 and 32 in that order toward the preamplifier PA. The Pockels cell control power supply 36 may cause the Pockels cell 34 to function as a shutter by controlling the voltage applied to the Pockels cell 34, and may control the laser pulse energy outputted from the master oscillator MO by controlling duration and degree of opening of the shutter.

Figure 30:
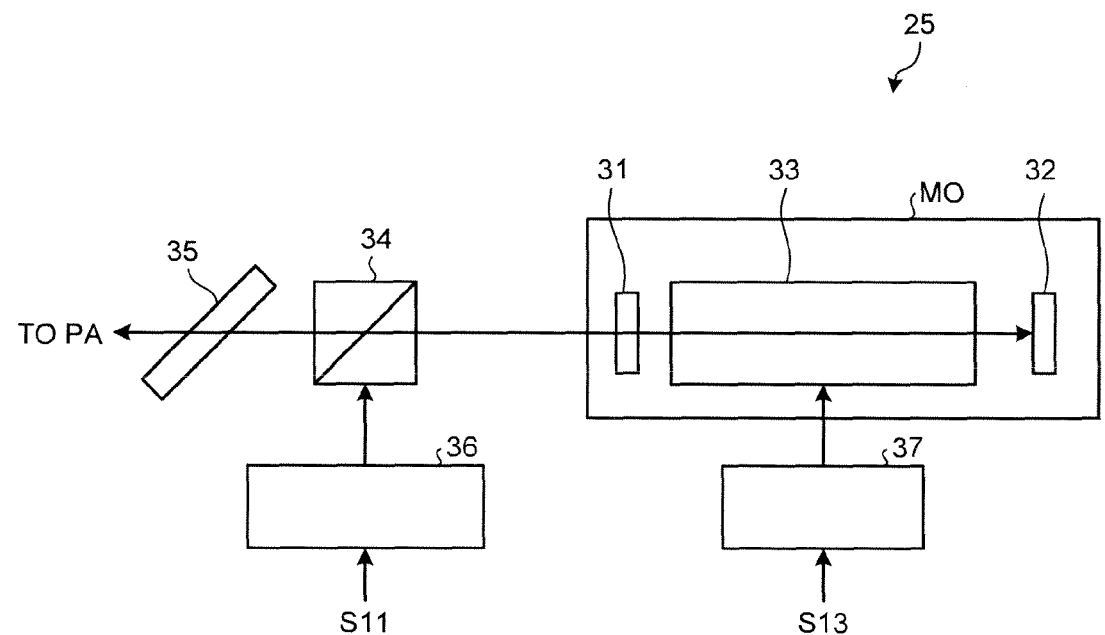
FIG. 30 schematically illustrates another example of an oscillator shown in FIG. 25, the oscillator being provided with a high-speed shutter on the exterior thereof.

Also, as shown in FIG. 30, the Pockels cell control power supply 36 may apply voltage, which causes the Pockels cell 34 to be open, for a predetermined period and the voltage applied from the laser power supply 37 to the $CO_2$ gain medium 33 may be controlled, whereby the intensity of the laser beam outputted from the master oscillator MO may be controlled.

Second Modification

In the above-described first modification, the configuration is such that the laser pulse energy inputted to the preamplifier PA is controlled by controlling the oscillator 25. In contrast, in the second modification, a regenerative amplifier 50 may be provided between the oscillator 25 and the preamplifier PA. The driver laser controller C1 may control the regenerative amplifier 50, and hence the laser pulse energy of the laser beam inputted to the preamplifier PA may be controlled. If the regenerative amplifier 50 is used, a pulsed laser beam with a small output such as a laser beam outputted from a semiconductor laser can efficiently be amplified in a state in which the pulse shape thereof is maintained, and be outputted to the preamplifier PA. The pulsed laser beam outputted from the regenerative amplifier 50 may efficiently be amplified by the preamplifier PA and the main amplifier MA.

Figure 31:
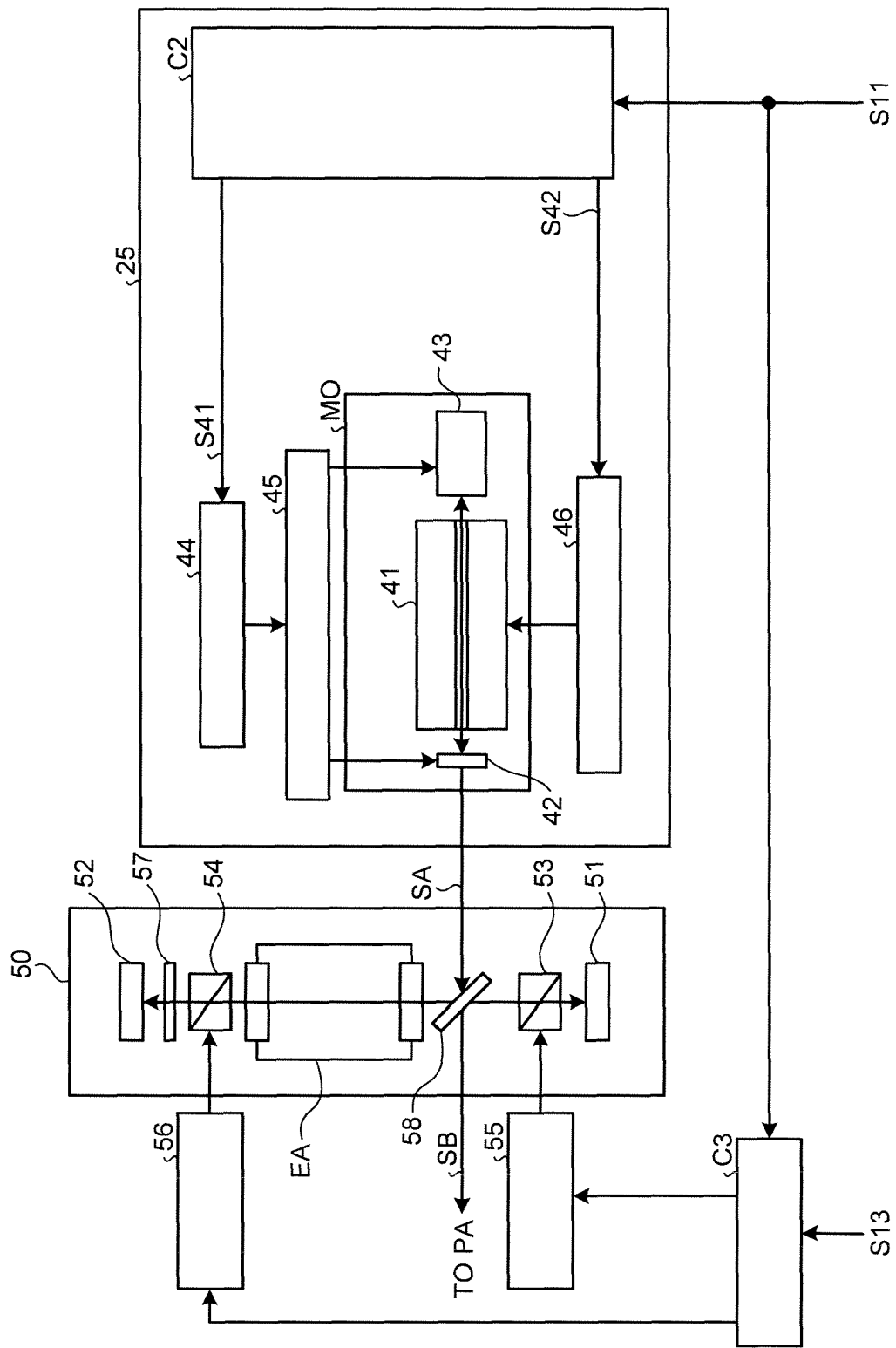
FIG. 31 schematically illustrates an EUV light generation system according to a second modification of this disclosure, in which a regenerative amplifier is provided between an oscillator and a preamplifier.

The regenerative amplifier 50 may amplify a seed pulsed beam SA outputted from the oscillator 25, and output the seed pulsed beam SA to the preamplifier PA. In the regenerative amplifier 50, for example, as shown in FIG. 31, a Pockels cell 53, a polarizer 58, a $CO_2$ laser amplification unit EA, a Pockels cell 54, and a quarter waveplate 57 may be arranged between a pair of resonator mirrors 51 and 52 in that order from the resonator mirror side. The seed pulsed beam SA outputted from the oscillator 25 may be made to enter the regenerative amplifier 50 through the polarizer 58, and the seed pulsed beam SA may be reciprocated between the resonator mirrors 51 and 52 to be amplified, and outputted as an amplified pulsed laser beam SB to the preamplifier PA through the polarizer 58.

Figure 32:
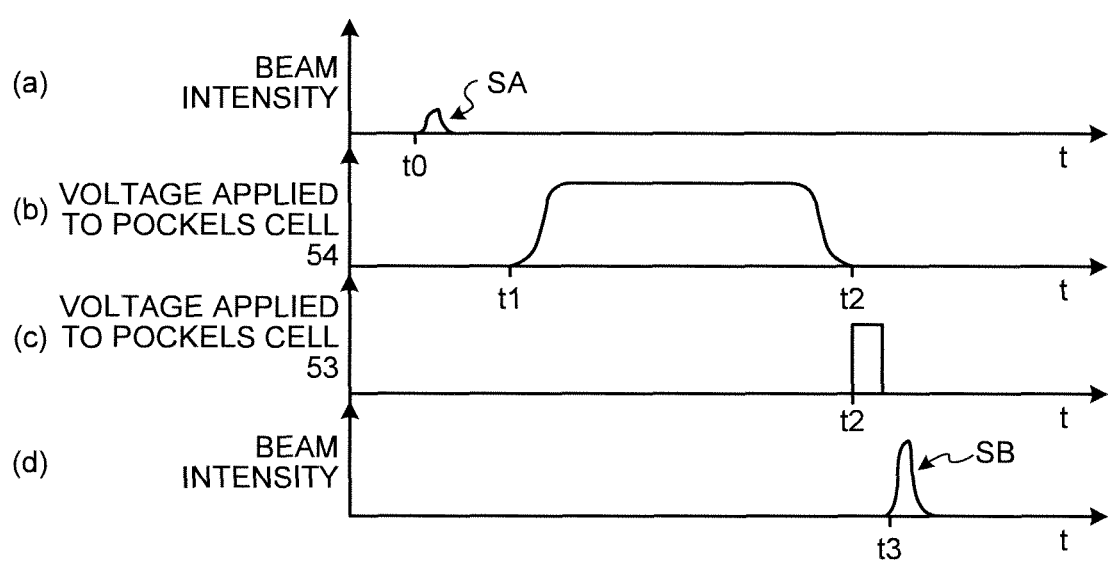
FIG. 32 shows operation of the regenerative amplifier shown in FIG. 31.

Now, the operation of the regenerative amplifier 50 will be described with reference to a timing chart shown in FIG. 32. The pulsed laser beam outputted from the oscillator 25 may be incident on the polarizer 58 as the seed pulsed beam SA at timing t0, for example. The S-polarized component of this incident beam, for example, may be reflected by the polarizer 58 and introduced into a resonator in the regenerative amplifier 50. The laser beam introduced into the regenerative amplifier 50 may be amplified as it passes through an amplification region of the $CO_2$ laser amplification unit EA, transmitted through the Pockels cell 54, to which voltage is not applied, without a phase shift, converted to a circularly polarized laser beam as it is transmitted through the quarter waveplate 57, reflected with high reflectivity by the resonator mirror 52, and converted to a linearly polarized laser beam that would be incident on the polarizer 58 as the P-polarized component. This laser beam may further be amplified as it passes through the amplification region of the $CO_2$ laser amplification unit EA. The amplified laser beam may be incident on the polarizer 58 as a laser beam of the P-polarized component, transmitted through the polarizer 58, transmitted through the Pockels cell 53, to which voltage is not applied, without a phase shift, and reflected with high reflectivity by the resonator mirror 51. The laser beam reflected with high reflectivity may be transmitted again through the Pockels cell 53 without a phase shift, transmitted through the polarizer 58, and further amplified as it passes again through the amplification region of the $CO_2$ laser amplification unit EA.

Then, the voltage is applied to the Pockels cell 54 at timing t1, the phase of the laser beam may change by a quarter wavelength as it passes through the Pockels cell 54, whereby the laser beam may be converted to a circularly polarized laser beam. The circularly polarized laser beam may be transmitted through the quarter waveplate 57, whereby it is converted to a linearly polarized laser beam that would be incident on the polarizer 58 as the S-polarized component. The laser beam reflected by the resonator mirror 52 may be converted into the circularly polarized laser beam as it is transmitted again through the quarter waveplate 57. Thereafter, the laser beam may be converted into a linearly polarized laser beam that would be incident on the polarizer 58 as the P-polarized component as it is transmitted through the Pockels cell 54 to which voltage is applied. The laser beam may further be amplified as it passes through the amplification region of the $CO_2$ laser amplification unit EA, transmitted through the polarizer 58, transmitted through the Pockels cell 53 to which the voltage is applied without a phase shift, reflected with high reflectivity by the resonator mirror 51, transmitted again through the Pockels cell 53 to which the voltage is not applied, and transmitted through the polarizer 58. In the state in which voltage is applied to the Pockels cell 54, the laser beam may be amplified as it is reciprocated between the resonator mirrors 51 and 52.

The voltage may be applied to the Pockels cell 53 at timing t2 at which the amplified pulsed laser beam SB is outputted outside, and the laser beam may be converted into the circularly polarized laser beam as it is transmitted through the Pockels cell 53 to which the voltage is not applied. The circularly polarized laser beam may be reflected with high reflectivity by the resonator mirror 51, and converted into a linearly polarized laser beam which would be incident on the polarizer 58 as the S-polarized component as it is transmitted again through the Pockels cell 53 to which the voltage is applied. The laser beam may be reflected with high reflectivity by the polarizer 58, and outputted as the amplified pulsed laser beam SB toward the external preamplifier PA.

Here, for the Pockels cells 53 and 54 of the regenerative amplifier 50, ON and OFF of voltage application may be performed by Pockels cell control power supplies 55 and 56. A regenerative amplifier controller C3 may control the Pockels cell control power supplies 55 and as described above based on the laser pulse energy control signal S13. That is, the laser pulse energy of the amplified pulsed laser beam SB can be controlled by increasing or decreasing the period during which voltage is applied to the Pockels cell 54. It is to be noted that the trigger signal S11 may be inputted to the semiconductor laser controller C2, and hence timing at which the seed pulsed beam SA is oscillated may be controlled.

Third Modification

In the above-described first modification, the oscillator 25 is controlled. In the second modification, the laser pulse energy is controlled by controlling the regenerative amplifier 50. In contrast, in the third modification, the laser pulse energy may be controlled by controlling at least one of the preamplifier PA and the main amplifier MA.

Figure 33:
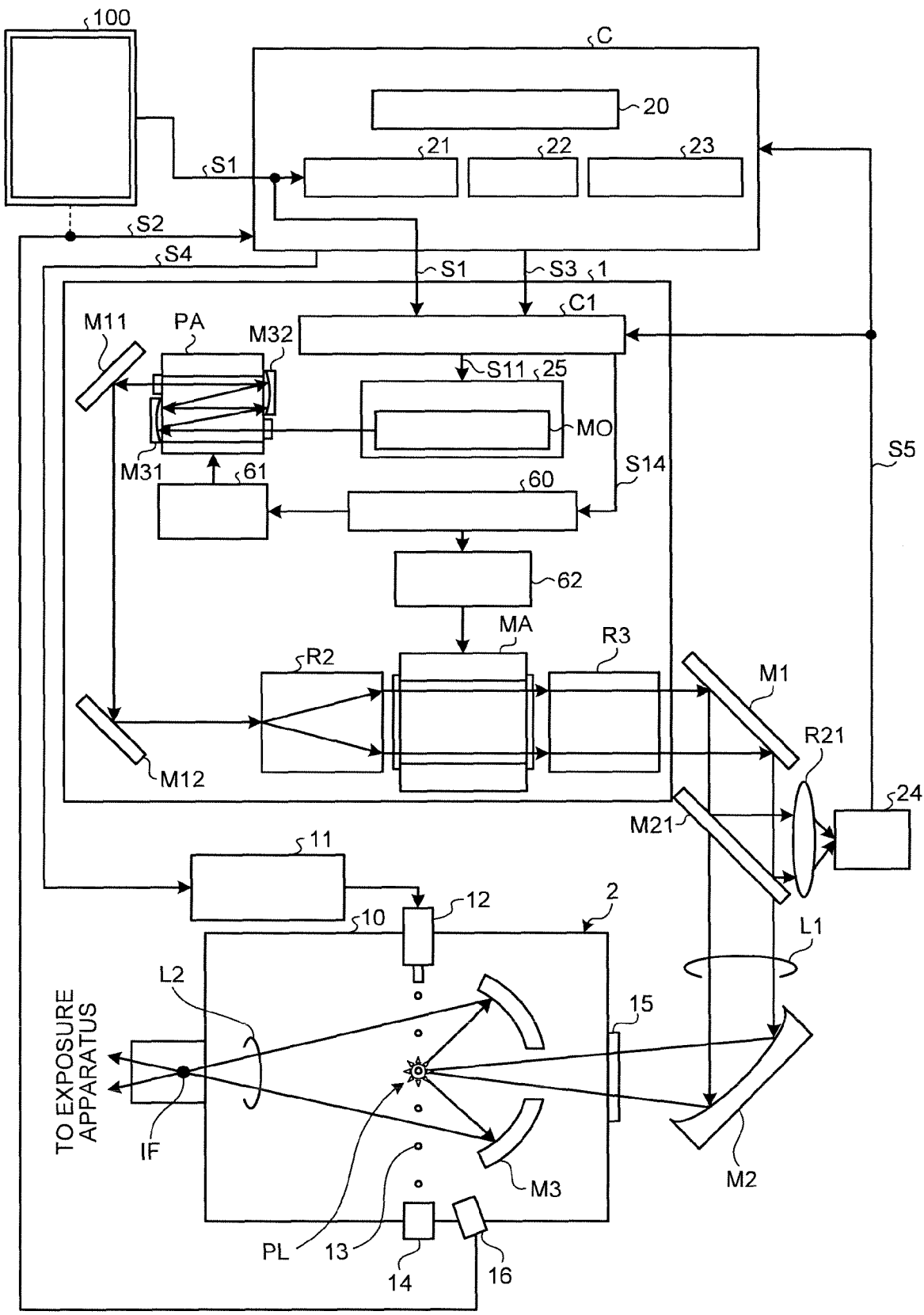
FIG. 33 schematically illustrates a configuration of an EUV light generation system according to a third modification of this disclosure.

In particular, as shown in FIG. 33, the driver laser controller C1 may output a laser pulse energy control signal S14 to an amplifier power supply controller 60 that controls a preamplifier power supply 61, which is a laser power supply for the preamplifier PA, and a main amplifier power supply 62, which is a laser power supply for the main amplifier MA. The amplifier controller 60 performs the laser pulse energy control by controlling the excitation intensity of the preamplifier PA and the main amplifier MA based on the laser pulse energy control signal S14.

Figure 34:
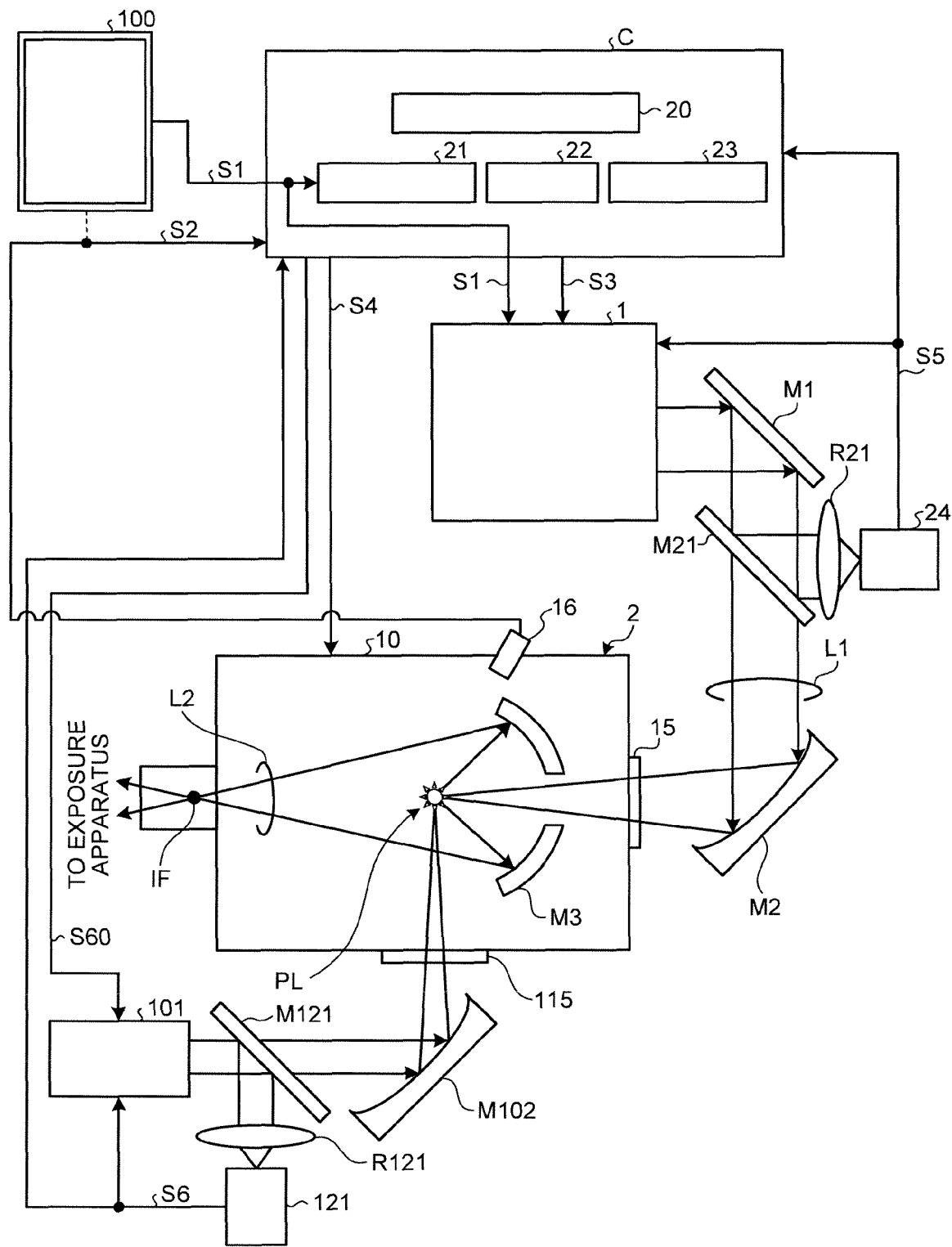
FIG. 34 schematically illustrates the EUV light generation system according to the first embodiment, to which a pre-pulse laser is additionally provided.

Also, as shown in FIG. 34, in the case where a pre-pulse laser 101 is used for irradiating the target 13 with pre-pulsed laser beam before the target 13 is irradiated with the $CO_2$ pulsed laser beam L1, the configuration may be such that EUV pulse energy may be controlled by controlling laser pulse energy of the laser beam outputted from the pre-pulse laser 101. If the pre-pulsed laser beam is used, when the target 13 is irradiated with the $CO_2$ pulsed laser beam L1, the target 13 may be turned into plasma more efficiently, whereby the EUV pulsed light can efficiently be emitted.

The pre-pulsed laser beam may strike the target 13 via an off-axis paraboloidal mirror M102. An optical element M121 configured of a partial reflection mirror or a beam splitter may be provided at the upstream side of the off-axis paraboloidal mirror M102. The pre-pulsed laser beam may be incident on a pre-pulsed laser beam detector 121 through the optical element M121 and a focusing lens R121, and the pre-pulsed laser beam detector 121 may detect the pulse energy of the pre-pulsed laser beam, and output a pre-pulsed laser pulse energy detection signal S6 to the pre-pulse laser 101 and the EUV light source controller C. The EUV light source controller C may output a control signal S60 to the pre-pulse laser 101 and control the laser pulse energy.

It is to be noted that the laser pulse energy of only the pre-pulse laser 101 may be controlled. Alternatively, the laser pulse energy of both the pre-pulse laser 101 and the driver laser 1 may be controlled.

The above-described embodiments and the modifications thereof are merely examples for embodying this disclosure, and this disclosure is not limited thereto. Making various modifications according to the specifications or the like is within the scope of this disclosure, and it is apparent from the above description that other various embodiments can be made within the scope of the disclosure. For example, it is needless to mention that the modifications indicated for each embodiment may be applied to another embodiment as well.

What is claimed is:

1. An extreme ultraviolet light generation apparatus, which generates extreme ultraviolet light by irradiating a target material with a laser pulse based on a trigger signal outputted from an exposure apparatus, comprising:
   a chamber;
   a target supply unit configured for outputting a target material into the chamber;
   a laser apparatus configured for outputting a laser pulse into the chamber;
   a timer configured for timing;
   a first storage unit configured for storing a parameter log of burst-outputted extreme ultraviolet light;
   an EUV light detector configured for detecting energy of the extreme ultraviolet light generated by irradiating the target material with the laser pulse; and
   a controller configured for outputting a control signal to the laser apparatus and for determining whether or not the trigger signal is a burst signal, in which successive outputting of trigger signals during a predetermined period and resting of outputting the trigger signals after the successive outputting are repeated alternately, based on a temporal interval of the trigger signals measured by the timer, and when the trigger signal is the burst signal executing a burst control in which the control signal is successively outputted to the laser apparatus, wherein
   the controller switches a learning control based on the parameter log stored in the first storage unit and a feedback control based on energy of a last extreme ultraviolet light detected by the EUV light detector during a period of burst control.

2. The extreme ultraviolet light generation apparatus of claim 1, wherein the laser apparatus includes a master oscillator, a preamplifier, and a main amplifier, and adjusts the energy of the laser pulse to be inputted into the preamplifier based on the control signal.

3. The extreme ultraviolet light generation apparatus of claim 1, wherein the laser apparatus includes a master oscillator, a preamplifier, and a main amplifier, and adjusts the energy of the laser pulse outputted from the master oscillator based on the control signal.

4. The extreme ultraviolet light generation apparatus of claim 1, wherein the laser apparatus includes a master oscillator, a regenerative amplifier, a preamplifier, a main amplifier, and adjusts the energy of the laser light pulse outputted from the regenerative amplifier based on the control signal.

5. The extreme ultraviolet light generation apparatus of claim 1, wherein the laser apparatus includes a master oscillator, a preamplifier, and a main amplifier, and adjusts the energy of the laser pulse by controlling at least one of the preamplifier and the main amplifier based on the control signal.

6. The extreme ultraviolet light generation apparatus of claim 1, further comprising:
   a calculation unit configured for calculating a control amount included in the control signal based on the temporal interval of the trigger signals timed by the timer and the parameter log stored in the first storage unit, wherein
   the controller outputs the control signal including the control value.

7. The extreme ultraviolet light generation apparatus of claim 6, further comprising:
   an energy measuring unit configured for measuring a pulse energy value of outputted extreme ultraviolet light; and
   a second storage unit configured for updatably storing a calculation result by the calculation unit.

8. The extreme ultraviolet light generation apparatus of claim 7, wherein
   the calculation unit calculates a difference between an energy value of desirable extreme ultraviolet light and an energy value of extreme ultraviolet light immediately preceding an extreme ultraviolet light pulse subject to be controlled, and further calculates a control amount of pulse energy of extreme ultraviolet light subject to be controlled based on the calculation result.

9. The extreme ultraviolet light generation apparatus of claim 1, wherein
   the laser apparatus includes a pockels cell and a control source of the pockels cell, and outputs the laser pulse while adjusting the energy of the laser pulse by controlling a voltage applied to the pockels cell from the control source based on the control signal.

10. The extreme ultraviolet light generation apparatus of claim 9, wherein
    the laser apparatus further includes a regenerative amplifier, and
    the pockels cell is included in the regenerative amplifier.

11. The extreme ultraviolet light generation apparatus of claim 1, wherein
    the laser apparatus includes a gain medium and a laser power supply, and outputs the laser pulse while adjusting the energy of the laser pulse by controlling a voltage applied to the gain medium from the laser power supply based on the control signal.

12. The extreme ultraviolet light generation apparatus of claim 11, wherein
    the laser apparatus further includes a regenerative amplifier, and
    the gain medium is included in the regenerative amplifier.

13. The extreme ultraviolet light generation apparatus of claim 1, wherein
    the laser apparatus includes a semiconductor device and a current control actuator, and outputs the laser pulse while adjusting the energy of the laser pulse by controlling a current shape applied to the semiconductor device from the current control actuator based on the control signal.

14. The extreme ultraviolet light generation apparatus of claim 1, wherein
    the controller counts a pulse number from a lead of the burst signal, and outputs the control signal corresponding to a counted result to the laser apparatus.

15. The extreme ultraviolet light generation apparatus of claim 1, wherein
    the controller determines an elapsed time from a lead of the burst signal by referring to the timer, and outputs the control signal corresponding to a timed result to the laser apparatus.

16. The extreme ultraviolet light generation apparatus of claim 1, wherein
    the controller determines a rest period during which the trigger signal is not outputted by referring to the timer, and outputs the control signal corresponding to a timed result to the laser apparatus.

17. The extreme ultraviolet light generation apparatus of claim 1, wherein
    the controller executes the feedback control after executing the learning control.

* * * * *